(12) United States Patent
Suwa et al.

(10) Patent No.: US 9,369,609 B2
(45) Date of Patent: Jun. 14, 2016

(54) INFORMATION PROCESSING APPARATUS E.G. PRINTING APPARATUS TO PRINT IMAGE BASED ON DATA TO BE PRINTED, DETERMINES PARAMETER TO BE USED BASED ON DEGREE OF COMPRESSION WHEN ERROR DIFFUSION PROCESSING IS PERFORMED ON EXPANDED IMAGE DATA

(71) Applicant: CANON KABUSHIKI KAISHA, Tokyo (JP)

(72) Inventors: Tetsuya Suwa, Yokohama (JP); Hiroyuki Sakai, Chigasaki (JP); Yuto Kajiwara, Kawasaki (JP); Akitoshi Yamada, Yokohama (JP); Kentaro Yano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/579,908

(22) Filed: Dec. 22, 2014

(65) Prior Publication Data

US 2015/0181079 A1    Jun. 25, 2015

(30) Foreign Application Priority Data

Dec. 24, 2013    (JP) .................................. 2013-265234

(51) Int. Cl.
*H04N 1/40* (2006.01)
*H04N 1/405* (2006.01)

(52) U.S. Cl.
CPC .................................. *H04N 1/4053* (2013.01)

(58) Field of Classification Search
None
See application file for complete search history.

(56) References Cited

U.S. PATENT DOCUMENTS

| 5,689,591 | A * | 11/1997 | Balram et al. ................. 382/276 |
| 5,710,639 | A * | 1/1998 | Kuznicki et al. ......... 358/426.03 |
| 7,486,834 | B2 * | 2/2009 | Bailey et al. ................... 382/252 |
| 2011/0032552 | A1 * | 2/2011 | Ishii ............................... 358/1.9 |

FOREIGN PATENT DOCUMENTS

JP    4053460 B2    2/2008

* cited by examiner

*Primary Examiner* — Steven Kau
(74) *Attorney, Agent, or Firm* — Canon USA, Inc. IP Division

(57) ABSTRACT

Based on information corresponding to the degree of compression of image data compressed in a lossy compression method, a parameter to be used when error diffusion processing is performed on the image data is determined.

20 Claims, 22 Drawing Sheets

PAPER FEEDING DIRECTION

FIG. 4

| (R, G, B) | DEVICE RGB (R, G, B) |
|---|---|
| (0, 0, 0) | (0, 0, 0) |
| (0, 0, 16) | (0, 0, 10) |
| (0, 0, 32) | (0, 3, 28) |
| ⋮ | ⋮ |
| ⋮ | ⋮ |
| (255, 255, 240) | (248, 255, 230) |
| (255, 255, 255) | (255, 255, 255) |

| (R, G, B) | (C, M, Y, K) |
|---|---|
| (0, 0, 0) | (0, 0, 0, 255) |
| (0, 0, 16) | (18, 16, 0, 246) |
| (0, 0, 32) | (33, 31, 0, 224) |
| ⋮ | ⋮ |
| ⋮ | ⋮ |
| (255, 255, 240) | (0, 0, 15, 0) |
| (255, 255, 255) | (0, 0, 0, 0) |

FIG. 10A
Q: 50

| 8 | 6 | 5 | 8 | 12 | 20 | 26 | 30 |
|---|---|---|---|----|----|----|----|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

FIG. 10B
Q: 70

| 4 | 3 | 2 | 4 | 6 | 10 | 13 | 15 |
|---|---|---|---|---|----|----|----|
| 3 | 3 | 3 | 5 | 6 | 14 | 15 | 14 |
| 3 | 3 | 4 | 6 | 10 | 14 | 17 | 14 |
| 3 | 4 | 5 | 7 | 13 | 22 | 20 | 15 |
| 4 | 5 | 9 | 14 | 17 | 27 | 26 | 19 |
| 6 | 9 | 14 | 16 | 20 | 26 | 28 | 23 |
| 12 | 16 | 19 | 22 | 26 | 30 | 30 | 25 |
| 18 | 23 | 24 | 24 | 28 | 25 | 26 | 25 |

FIG. 10C
Q: 90

| 2 | 1 | 1 | 2 | 3 | 5 | 6 | 7 |
|---|---|---|---|---|---|---|---|
| 1 | 1 | 1 | 2 | 3 | 7 | 7 | 7 |
| 1 | 1 | 2 | 3 | 5 | 7 | 8 | 7 |
| 1 | 2 | 2 | 3 | 6 | 11 | 10 | 7 |
| 2 | 2 | 4 | 7 | 8 | 13 | 13 | 9 |
| 3 | 4 | 7 | 8 | 10 | 13 | 14 | 11 |
| 6 | 8 | 9 | 11 | 13 | 15 | 15 | 12 |
| 9 | 11 | 12 | 12 | 14 | 12 | 13 | 12 |

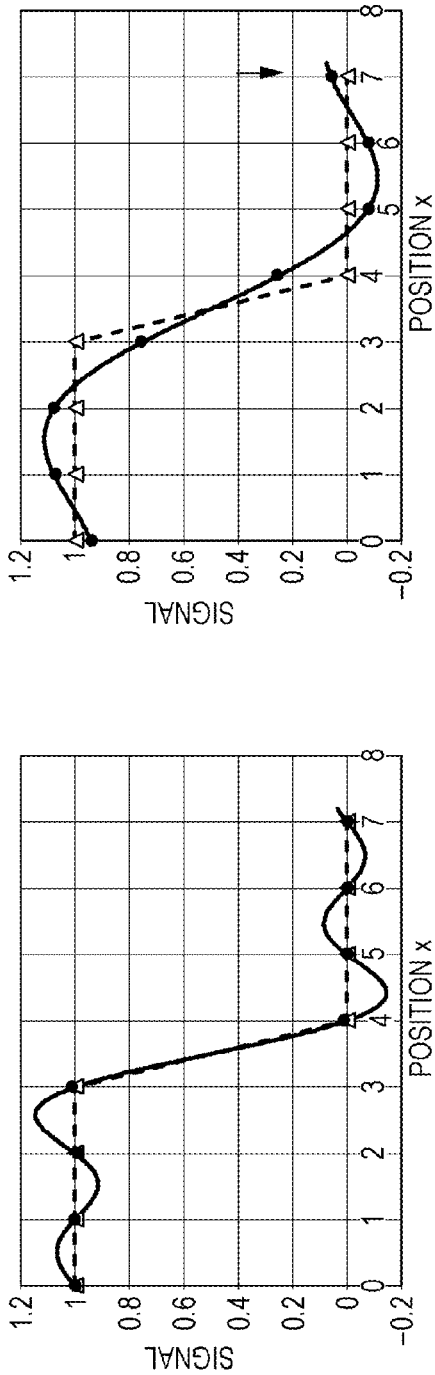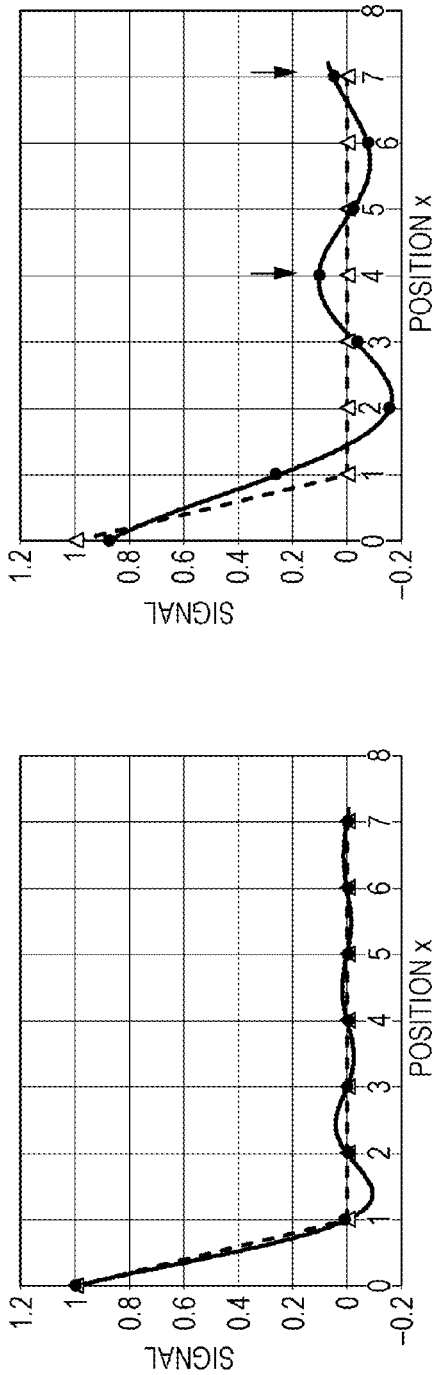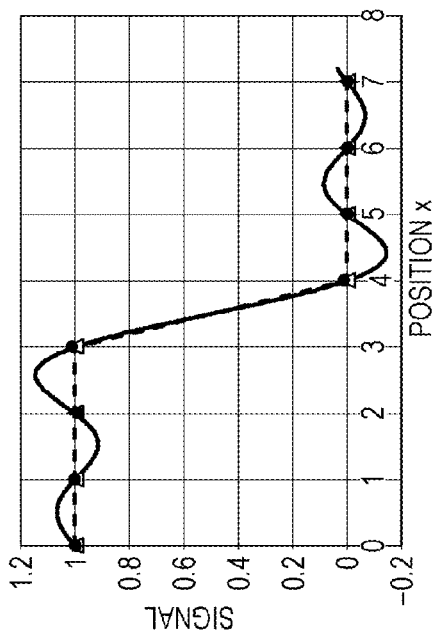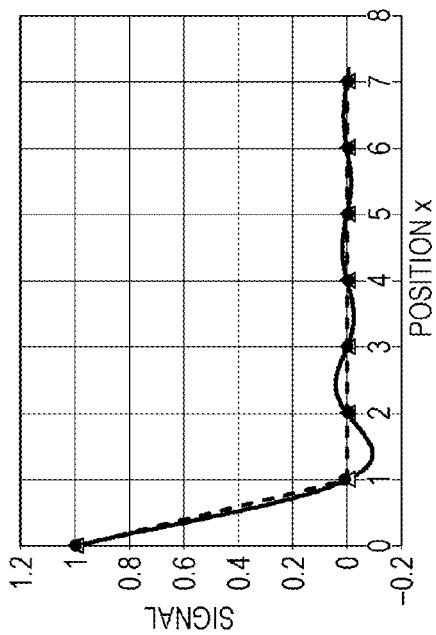

INFORMATION PROCESSING APPARATUS E.G. PRINTING APPARATUS TO PRINT IMAGE BASED ON DATA TO BE PRINTED, DETERMINES PARAMETER TO BE USED BASED ON DEGREE OF COMPRESSION WHEN ERROR DIFFUSION PROCESSING IS PERFORMED ON EXPANDED IMAGE DATA

BACKGROUND

1. Field of the Disclosure

The present disclosure relates to an information processing apparatus, an information processing method, and a program for determining a parameter to be used when error diffusion processing is performed for printing of an image based on lossy-compressed image data.

2. Description of the Related Art

A printing apparatus that performs printing of images may perform printing of an image based on image data which has been compressed in a lossy-compression method. A Joint Photographic Expert Group (JPEG) method is an example of such a lossy-compression method. Image data compressed in the JPEG method is expanded, and an image based on the expanded image data is printed on a recording medium by a printing apparatus.

As described above, the JPEG method is a lossy compression method. Therefore, image degradation called mosquito noise may occur in an expanded image. The mosquito noise arises from quantization processing in JPEG compression. In the JPEG method, by quantization processing for an image which has been converted into a frequency by discrete cosine transform (DCT), in particular, information of a high-frequency component is eliminated. Accordingly, when expansion processing is performed, for example, a signal value which does not originally exist around edges within the expanded image may be generated as the above-mentioned mosquito noise.

In Japanese Patent No. 4053460, processing for eliminating mosquito noise from image data obtained by expanding compressed image data, is suggested. Specifically, image data obtained by expanding compressed image data is divided in units of blocks, noise determination processing is performed, and the type of noise and the degree of occurrence of noise are determined. Then, switching a diffusion factor in error diffusion processing performed for creating printing data, based on the noise determination result, is described in Japanese Patent No. 4053460.

In Japanese Patent No. 4053460, a determination is made based on an image on which expansion processing has been performed. Therefore, it may be impossible to distinguish whether a portion determined to be noise is generated by lossy compression and expansion or is included in the original image before compression and expansion. As a result, for example, even if the degree of compression in the lossy compression method is small and noise is less likely to occur, a portion included in the original image may be falsely determined to be noise. A diffusion factor may be determined in accordance with the false determination result.

SUMMARY

The present disclosure provides an information processing apparatus and an information processing method capable of determining a parameter to be used when error diffusion processing is performed for image data which has been compressed in a lossy compression method.

Further features of the present invention will become apparent from the following description of exemplary embodiments with reference to the attached drawings.

BRIEF DESCRIPTION OF THE DRAWINGS

FIG. 4 illustrates an example of a color correction table.

FIGS. 10A, 10B, and 10C are diagrams illustrating examples of quantization table stored in advance in a printing apparatus.

FIGS. 12A-1, 12A-2, 12B-1, and 12B-2 are graphs illustrating results of processing for pixels arranged one-dimensionally.

DESCRIPTION OF THE EMBODIMENTS

Hereinafter, embodiments of the present invention will be described. The embodiments described below are merely examples. The present invention is not limited to the embodiments described below.

Explanation of Hardware Configuration

Figure 1:
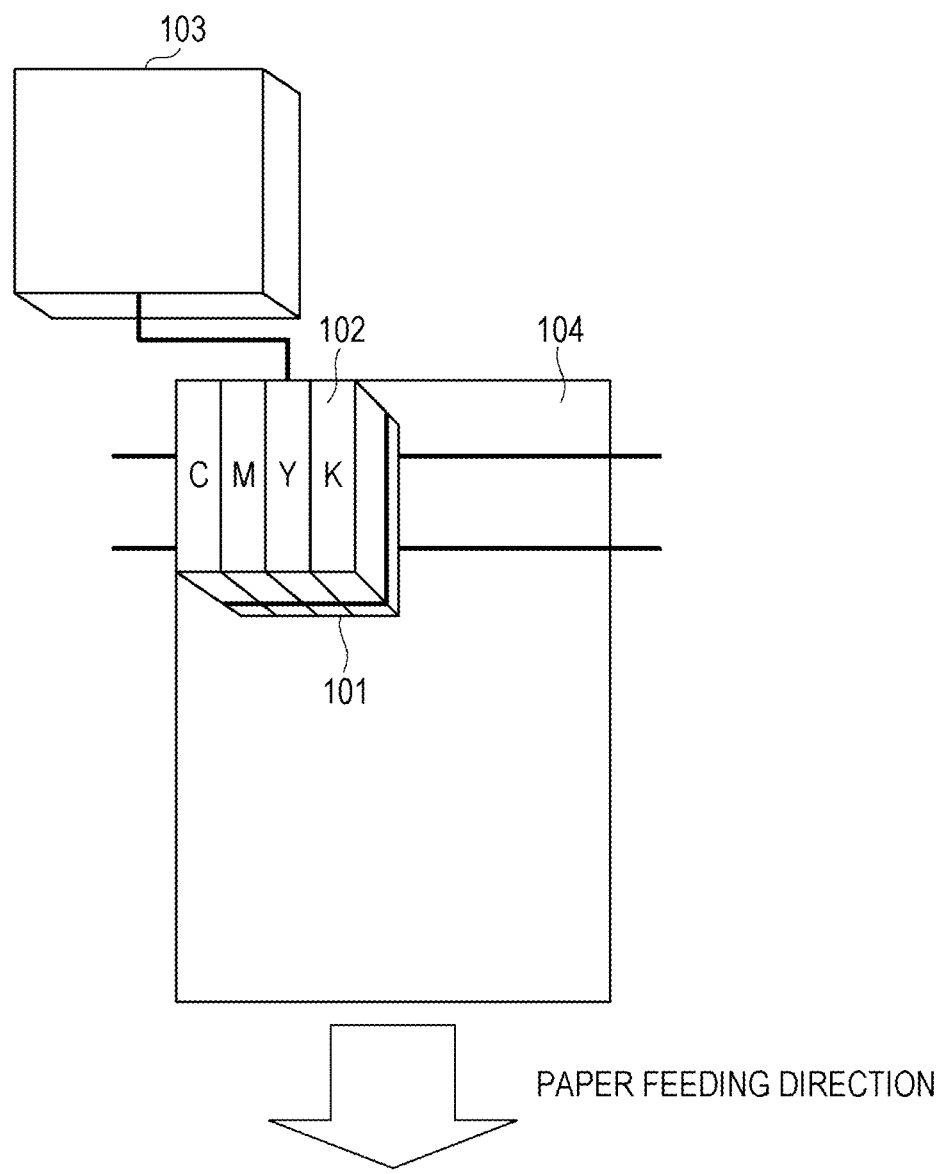
FIG. 1 is a diagram illustrating an example of an ink jet recording apparatus according to an embodiment.

FIG. 1 is a diagram illustrating an example of an ink jet recording apparatus according to an embodiment. An ink tank 102 filled with ink is mounted on a recording head 101. FIG. 1 illustrates an example in which ink of four colors is filled in the ink tank 102. An ink tank of any color may be installed. Ink tanks in which ink of the same color of different materials, such as dyes and pigments, is filled may be installed.

A control circuit portion 103 includes a storage part, an arithmetic operation part, and a communication part for driving the recording head 101. The recording head 101 receives a recording signal indicating whether or not ink ejection is necessary and a control signal indicating the timing of the ejection, and ejects ink based on the recording signal in accordance with the control signal. A recording medium 104, which is a recording medium, is supplied with ink ejected from the recording head 101 while being conveyed through a conveyance roller, which is not illustrated. Accordingly, an image is recorded on the recording medium 104.

In this embodiment, an ink jet recording apparatus will be explained as an example of a printing apparatus. However, a printing apparatus which performs printing by supplying toner by an electrophotographic method is also applicable. Furthermore, a recording method in which ink is supplied while a carriage on which the recording head 101 and the ink tank 102 are mounted is performing scanning in a direction orthogonal to the conveyance direction of the recording medium 104, is illustrated in FIG. 1. However, the present invention is not limited to this. A printing apparatus may include a line head having a length equal to or longer than the length in the width direction of the recording medium 104 and perform printing without performing the scanning mentioned above.

Figure 2:
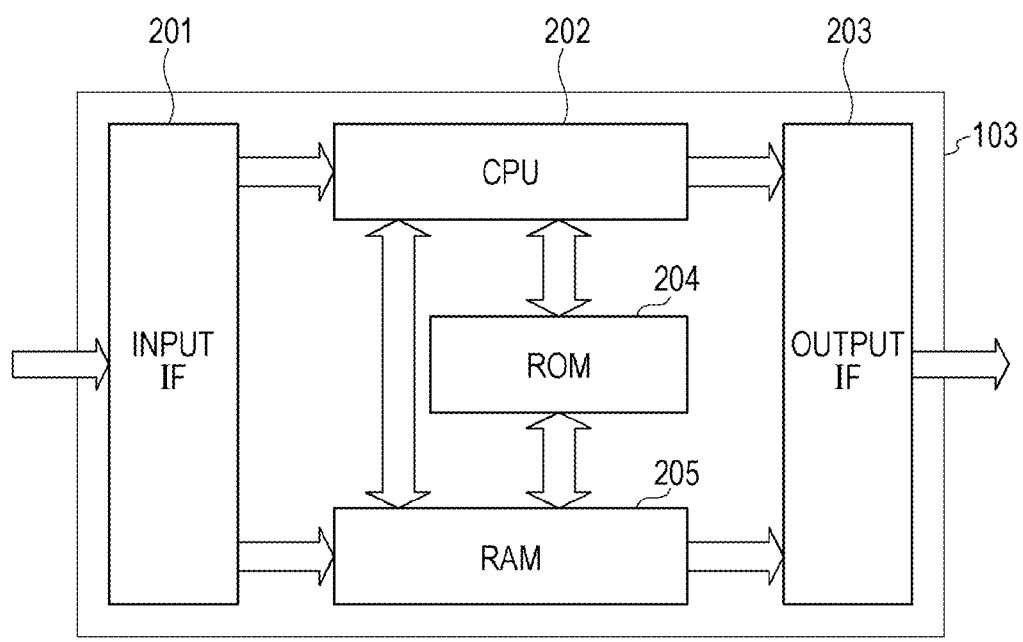
FIG. 2 is a block diagram illustrating a configuration of a control circuit portion.

FIG. 2 is a block diagram illustrating a configuration of the control circuit portion 103. The control circuit portion 103 includes an input interface 201, a central processing unit (CPU) 202, an output interface 203, a read-only memory (ROM) 204, and a random access memory (RAM) 205. The ROM 204 is a nonvolatile memory. A control program for controlling the control circuit portion 103 and the entire printing apparatus is stored in the ROM 204. The RAM 205 is a memory for storing the control program stored in the ROM 204 and various data including image data and various parameters.

The CPU 202 controls the control circuit portion 103 and the entire printing apparatus by reading the control program stored in the ROM 204, which is a nonvolatile memory, onto the RAM 205 and executing the control program on the RAM 205. More specifically, the CPU 202 receives an user instruction from an operation portion, an external computer, a smartphone, a tablet, and the like, which are not illustrated, and performs control in accordance with the instruction.

The input interface 201 receives input of image data to be recorded and a control signal for driving the recording head, from an external or internal memory, an external computer, and the like, which are not illustrated. The input interface 201 transmits the image data and the control signal to the RAM 205 and the CPU 202. At this time, the CPU 202 converts the image data into a recording signal for ink ejection by executing, on the RAM 205, the control program stored in the ROM 204. The thus converted recording signal is output from the output interface 203 as recording data, along with the control signal. The recording head 101 is driven by the output recording data and control signal, and an image is recorded on the recording medium 104.

For example, when image data compressed by JPEG method is input through the input interface 201, the CPU 202 performs JPEG expansion processing for the image data, and converts the expanded image data into a recording signal.

Although the CPU 202 performs JPEG expansion processing and conversion processing into a recording signal in the example of FIG. 2, the present invention is not limited to this. More specifically, a hardware circuit which performs the JPEG expansion processing and/or conversion processing may be provided separately from the control circuit portion 103, and the hardware circuit may perform the JPEG expansion processing and/or conversion processing.

In this embodiment, image data which has been compressed in the JPEG method, which is the lossy compression method, is input to the input interface 201, and the CPU 202 performs expansion processing for the image data and conversion processing into a recording signal. In the compression of the JPEG method, due to compression and expansion, information which does not exist in the original image before compression may be generated as mosquito noise. In particular, the visibility of characters in a document image which mainly contains characters may be degraded by mosquito noise generated around a character portion. For example, in the case where a document image in which mosquito noise has been generated is printed by an ink jet printing apparatus, occurrence of ink bleeding may reduce, in particular, the legibility of small characters, and ink is thus wasted.

In this embodiment, an error diffusion parameter to be used when multi-valued image data is converted into printing data by error diffusion processing is determined in accordance with the degree of compression when lossy compression was performed. The details will be described later.

In this embodiment, an example in which acquisition of lossy-compressed image data, expansion processing of the lossy-compressed image data, creation of printing data by gradation conversion, and the like are performed in a printing apparatus is explained. For example, in the case where the above processing is performed by a printer driver in a host apparatus which is connected to a printing apparatus, the printer driver needs to be installed in the individual host apparatuses. Therefore, in the case where various devices, such as a personal computer (PC), a smartphone, and a tablet, cause a printing apparatus to perform printing through various interfaces, the printer driver needs to be installed in all these devices. Furthermore, since a printer driver may be provided for each type of a printing apparatus, in the case where a host apparatus causes printing apparatuses of different types to perform printing, a printer driver needs to be installed for each of the apparatus type.

In this embodiment, an example in which acquisition of lossy-compressed image data, expansion processing of the lossy-compressed image data, creation of printing data by gradation conversion, and the like are performed in a printing apparatus is explained. Therefore, a host apparatus is able to cause a printing apparatus to perform printing by transmitting image data which has not been converted into printing data, even without processing by a printer driver. Furthermore, image data on which compression processing has been performed can be transmitted. Therefore, compared to the case where expanded data is transmitted, data to be printed can be transmitted to the printing apparatus more rapidly.

Block Diagram of Firmware

Figure 3:
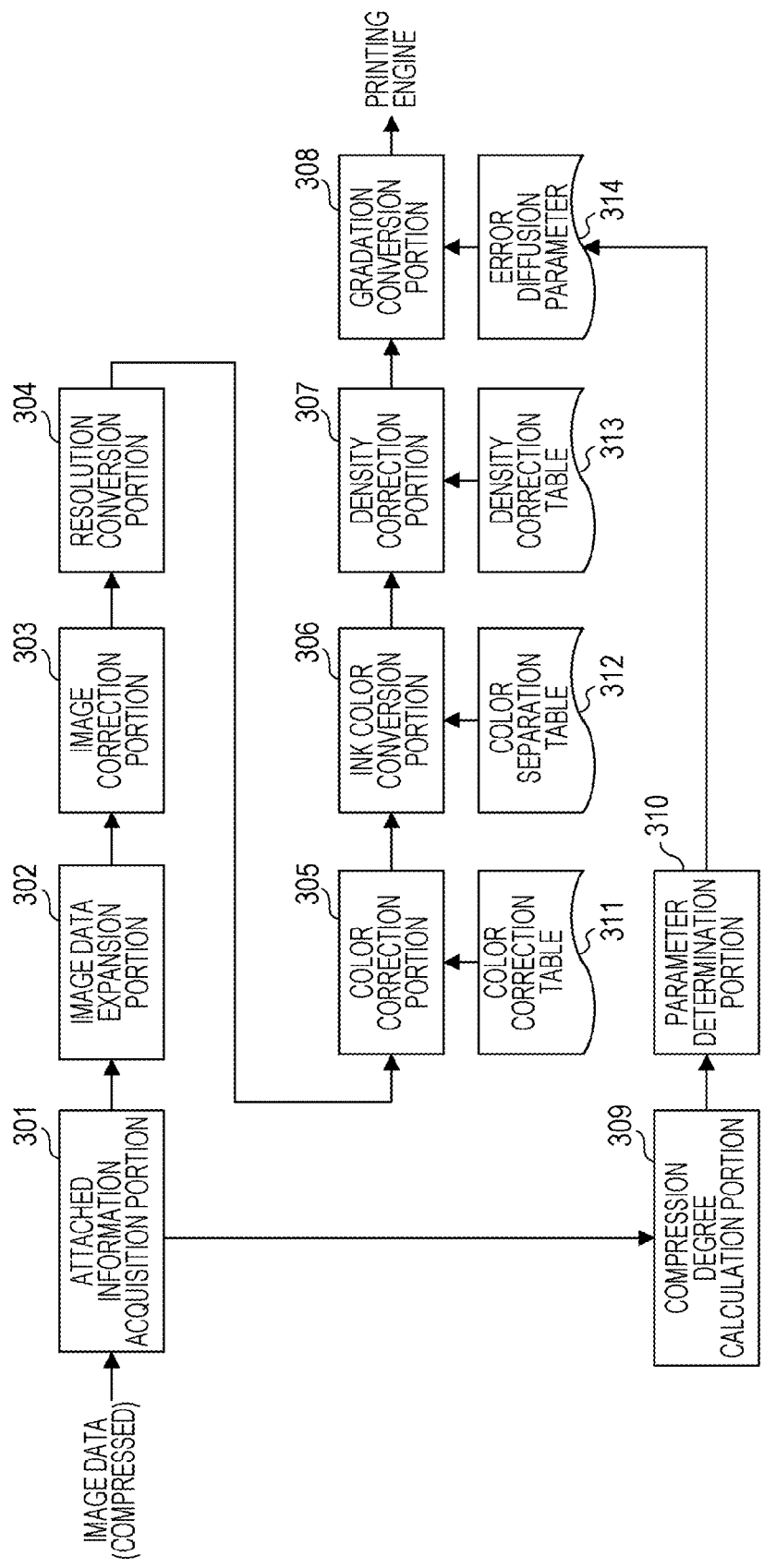
FIG. 3 is a diagram illustrating a functional block of firmware.

FIG. 3 illustrates an example of a block diagram of a firmware configuration according to an embodiment. Functions of the individual blocks illustrated in FIG. 3 are stored as program modules of the control program in the ROM 204, and the functions of the individual blocks in FIG. 3 are implemented when the CPU 202 executes these modules. A hardware circuit for performing part or all of these blocks may be provided separately. By allowing the hardware circuit to implement all the functions or to implement part of the functions and cooperate with the CPU 202, the functions explained with reference to FIG. 3 may be implemented.

Processing illustrated in FIG. 3 is performed on image data input to the input interface 201 to convert the image data into a recording signal of a resolution and the number of gradation levels that can be received by a printing engine, which is not illustrated, connected to the recording head, and the recording signal is output to the printing engine. Then, the CPU 202 causes the printing engine to print an image based on the image data by performing printing control for controlling the printing engine. Hereinafter, the details will be described.

Explanation of Individual Processing Portions

An attached information acquisition portion 301 acquires various parameters used when image data was compressed. These parameters include information for identifying the compression ratio of the image data. For example, in the case where a JPEG file of JPEG-compressed image data is input, the JPEG file contains a quantization table and image data size used when JPEG compression was performed. By using the above information, a quantization factor (Q factor) for identifying the number of quantization steps can be obtained. The attached information acquisition portion 301 acquires the quantization table (Q table) and the image data size (the number of vertical pixels and the number of horizontal pixels).

Furthermore, the various parameters acquired by the attached information acquisition portion 301 are transmitted to an image data expansion portion 302 to be used for processing for expanding the compressed image data. The various parameters are also transmitted to a compression degree calculation portion 309 to be used for processing for calculating the degree of compression at the time when the image data was compressed.

Figure 8:
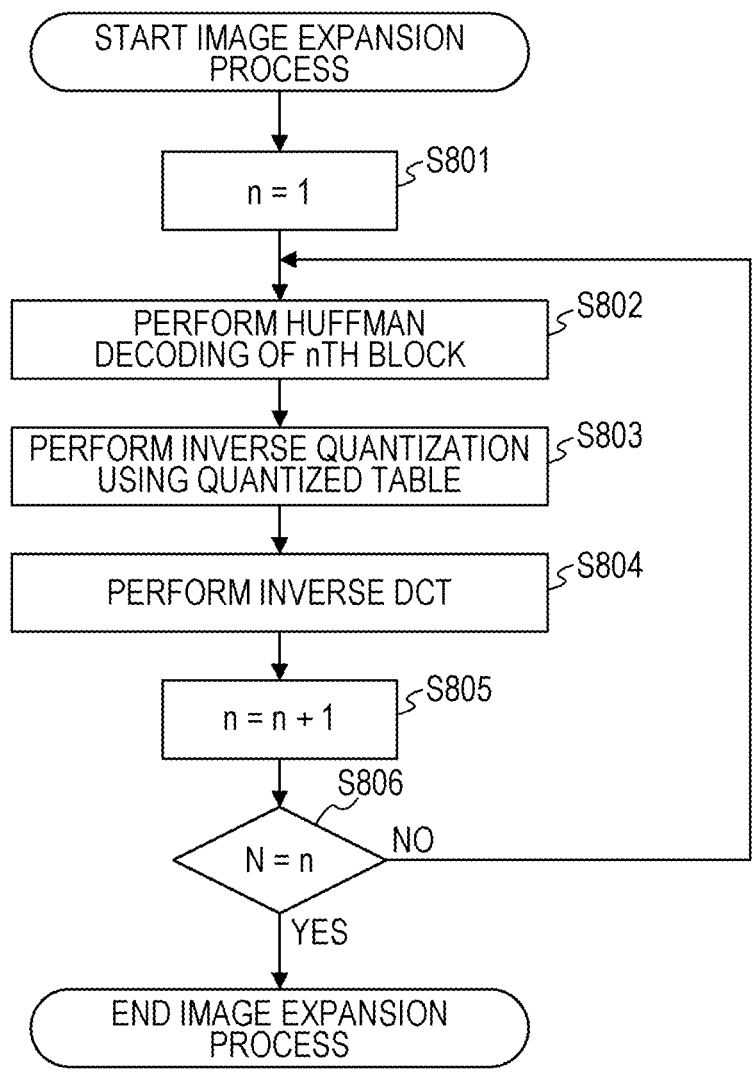
FIG. 8 is a flowchart of a decoding process for image data.

The image data expansion portion 302 is a processing portion which decodes the encoded image data to extract image data. In the case where the input image data is compressed, the image data expansion portion 302 performs expansion of the image data by performing expansion processing corresponding to the compression method of the image data. The processing performed by the image data expansion portion 302 will be described with reference to FIG. 8. FIG. 8 illustrates an example of the case where the compression method is a JPEG method.

FIG. 8 is a flowchart of a decoding process for image data. A program corresponding to the process illustrated in FIG. 8 is stored as a program module of the image data expansion portion 302 in the ROM 204, and the process illustrated in FIG. 8 is implemented when the CPU 202 executes the program.

An image in a JPEG data method is obtained by performing compression processing for each N square blocks each having 8 pixels. In FIG. 8, initialization is performed by setting a variable n representing a block as a target of expansion processing to 1 (S801).

Next, Huffman decoding is performed for the 8-pixel square block n to be processed (S802). Then, inverse quantization is performed using a quantization table acquired by the attached information acquisition portion 301 (S803). That is, inverse quantization is performed using a quantization table which was used for compression of the image and which is contained in an image file containing the image. Then, inverse discrete cosine transform (DCT) is performed (S804).

Next, the variable n is incremented by one (S805), and a comparison between the incremented variable n and the number N of all blocks of the image (S806).

If the variable n is less than the number N of all blocks, it is determined that a block to be processed remains, and processing of S802 to S805 is repeated. The number N of all blocks may be obtained by dividing the number of vertical and horizontal pixels represented as the image data size acquired by the attached information acquisition portion 301 by 8 pixels.

Huffman encoding is a method for performing compression by reducing the number of the entire bits by allocating a short code of a small number of bits to data of a high appearance frequency. In the Huffman decoding in S802, decoding is performed using Huffman code corresponding to the Huffman encoding.

In the inverse quantization in S803, inverse quantization is performed using the quantization table which was used for compression and which is acquired by the attached information acquisition portion 301, and development to image data is performed.

The inverse DCT in S804 is processing for performing inverse transform for returning image data which has been divided into DC components and AC components by DCT to the original image density components. The JPEG compression may be performed in a method of a luminance Y and color differences Cb and Cr. In this case, data on which inverse DCT processing has been performed has a YCbCr form. Image signal values RGB are obtained in accordance with Equation 1.

$$R=(Y+128)+1.402(Cr-128)$$

$$G=(Y+128)-0.34414(Cb-128)-0.71414(Cr-128)$$

$$B=(Y+128)+1.772(Cb-128) \quad \text{Equation 1}$$

The image signal values RGB obtained as described above by the image data expansion portion 302 are transmitted to an image correction portion 303.

The image correction portion 303 performs image correction of the RGB data. Image correction may include, for example, lightness adjustment for brightening or darkening the entire color, contrast adjustment, color balance adjustment, and backlight correction and red-eye correction in photography printing. By performing the above corrections for this block in a unitary manner, processing which does not depend on a printing apparatus can be achieved. The image on which correction has been performed as described above by the image correction portion 303 is transmitted to a resolution conversion portion 304.

The resolution conversion portion 304 converts an image into a resolution corresponding to a printing apparatus. A necessary scaling amount is derived from input image data and the resolution of the printing apparatus, and enlarging or reducing processing is performed. Scaling processing includes, for example, a nearest neighbor method, a bilinear method, and a bicubic method. The above processing is appropriately selected taking into consideration the characteristics of the processing, the processing speed, and a printing mode set in the corresponding printing. The image on which resolution conversion has been performed as described above is transmitted to a color correction portion 305.

The color correction portion 305 performs color conversion processing for output from the printing apparatus. For example, in the case where an image displayed on a display device is recorded, the color reproduction range is not always the same between display and printing. For example, a certain color has a narrower reproduction range for a printing apparatus, and a different color has a narrower reproduction range for a display device. There is a need to minimize such image degradation and perform color compression and expansion in an appropriate manner.

In this embodiment, the color correction portion 305 performs the above processing in an RGB method. That is, RGB values input to the block are converted into RGB values for the printing apparatus (hereinafter, for distinction, referred to as Device RGB) by taking the reproductivity of the device into consideration. Conversion may be performed through calculation of a matrix and the like. In this embodiment, however, a three-dimensional color correction table 311 is used.

In the case where RGB values each having 8 bits (256 gradation levels) are input, when all the combinations are maintained, the data volume of data representing the combinations is large. Therefore, the color correction table 311, in which thinning is performed at specific intervals, is used.

FIG. 4 illustrates an example of a color correction table.

In the example of FIG. 4, the color correction table describes Device RGB values corresponding to 17 grid points, which represent 256 gradation levels of each color (17·17·17=4913 grid points).

A value between grid points is calculated using interpolation processing. In this embodiment, a process using tetrahedral interpolation is described as an interpolation method. The tetrahedral interpolation method is linear interpolation in which a three-dimensional space is divided into units of tetrahedrons and four grid points are used.

Figure 5A:
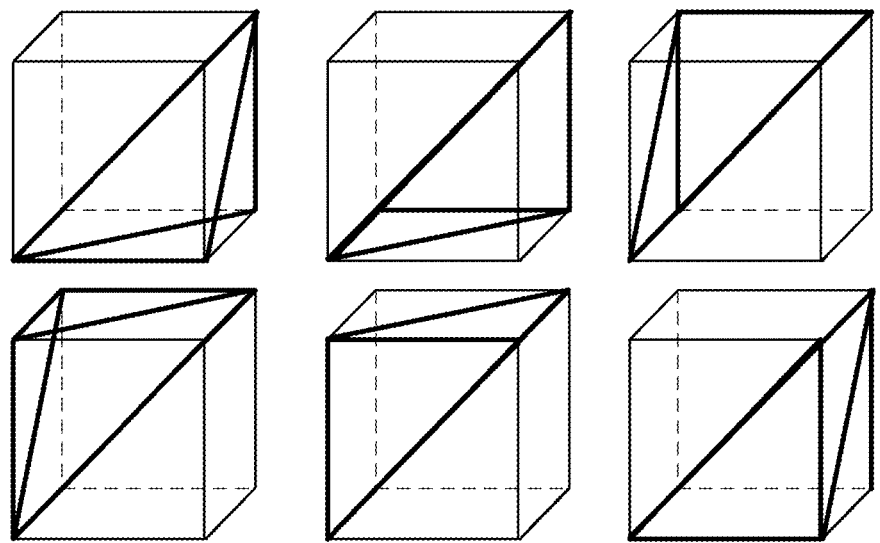
FIGS. 5A and 5B are diagrams for explaining a tetrahedral interpolation method.
Figure 5B:
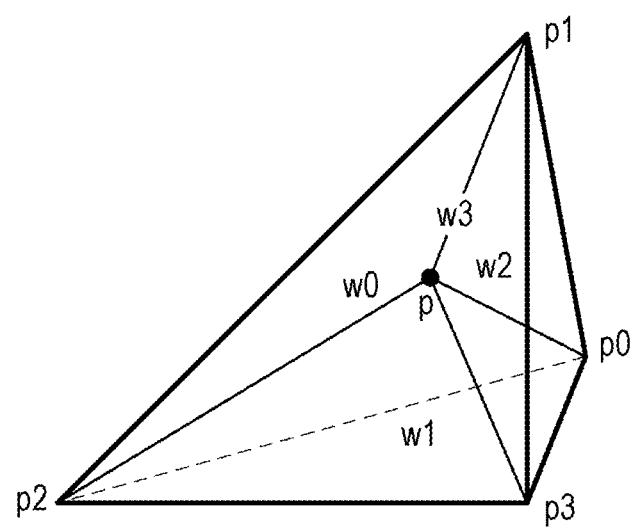

FIGS. 5A and 5B are diagrams for explaining a tetrahedral interpolation method. First, division into tetrahedrons is performed, using Equation 2, as illustrated in FIG. 5A. Then, it is determined to which one of the divided tetrahedrons a target point p belongs. The four vertices of the tetrahedron are represented by p0, p1, p2, and p3, and the tetrahedron is further divided into small tetrahedrons, as illustrated in FIG. 5B. In the case where conversion values of the individual points are represented by f(p0), f(p1), f(p2), and f(p3), an interpolation value f(p) is obtained using Equation 2.

$$f(p) = \sum_{i=0}^{3} wi \times f(pi) = [w0, w1, w2, w3]\begin{bmatrix} f(p0) \\ f(p1) \\ f(p2) \\ f(p3) \end{bmatrix}$$ Equation 2

In Equation 2, w0, w1, w2, and w3 represent the volume rate of small tetrahedrons at anti-counter positions with respect to the individual vertices pi to the entire tetrahedron p0p1p2p3. The Device RGB values corresponding to the target RGB values are calculated as described above. 8 bits or more may be output, in consideration of the gradation characteristics.

Furthermore, since the color correction table also depends on the color reproduction range of the printing apparatus as described above, for example, in the case where different types of recording paper are used for recording, tables corresponding to the types of recording paper may be prepared. After the color correction processing is performed for the image to be printed by the color correction portion 305 as described above, the color-corrected image is transmitted to an ink color conversion portion 306.

The ink color conversion portion 306 converts the Device RGB values determined by the color correction portion into ink colors CMYK. In the conversion, a color separation table 312 in which the values of ink colors corresponding to the combinations of the Device RGB are described in advance, is used. For this block, as with the color correction portion 305, a table of 17 grid points is used.

Figures 6, 7:
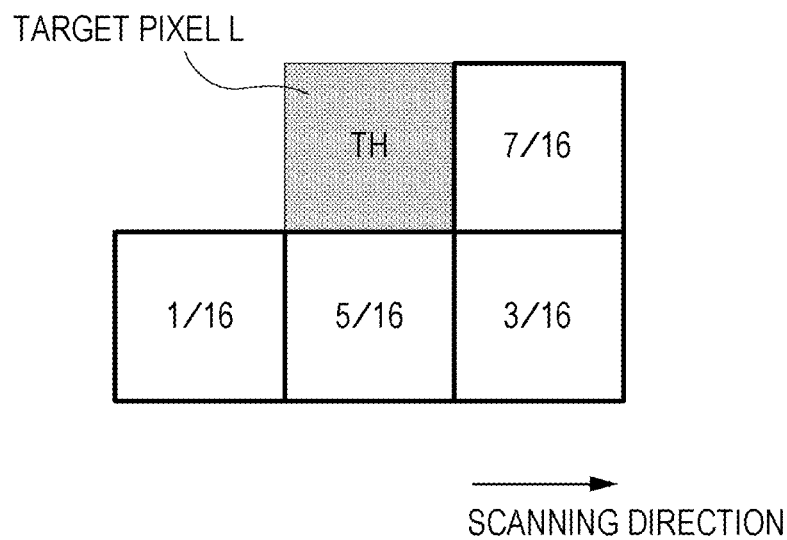
FIG. 6 illustrates an example of a color separation table.
FIG. 7 is a diagram illustrating an error distribution method in an error diffusion method.

FIG. 6 illustrates an example of the color separation table 312. In this embodiment, for example, values of four colors: cyan (C), magenta (M), yellow (Y), and black (K), corresponding to the individual grid points are described as ink colors. These values are determined taking into consideration that ink does not bleed on recording paper and ink bleeding does not occur when two pieces of ink are closed to each other. That is, in the case where different types of recording paper are used, color separation tables 312 corresponding to the different types of recording paper may be prepared.

As with the color correction portion described above, values obtained after ink separation corresponding to the target device RGB values may be obtained by using the tetrahedral interpolation processing described with reference to FIGS. 5A and 5B. After the image data is converted into CMYK data as described above, the converted data is transmitted to a density correction portion 307.

In the case of ink jet recording, as the amount of ink applied as dots on recording paper increases, overlapping of dots increases, and it becomes more difficult for the recording density to increase. Therefore, the density correction portion 307 corrects the density to achieve a uniform density responsiveness. With the density correction, the accuracy at the time of creation of the above-mentioned color correction table 311 and color separation table 312 can be easily ensured. Since the correction can be performed for each of C, M, Y, and K, a one-dimensional density correction table 313 is used here. A table corresponding to 8 bits (256 gradation levels) of input of individual colors can be prepared. Thinning is not particularly required, and the table only needs to describe values corresponding to individual signal values. The data on which the density correction has been performed as described above is transmitted to a gradation conversion portion 308.

The gradation conversion portion 308 converts multi-bit data which has been subjected to ink color conversion and density correction into a recording signal, in accordance with the number of gradation levels that can be recorded by the printing apparatus. For an explanation of gradation conversion processing, a recording signal of two gradation levels (1 bit): record (1) and non-record (0), will be described below. For example, error diffusion processing for conversion into binary data will be explained as a gradation conversion method. In addition, for example, 0 to 255 (8 bits) will be explained as an input signal of multi-bit data.

FIG. 7 is a diagram illustrating an error distribution method in an error diffusion method. When the signal value of a target pixel (pixel of target) is represented by L, the signal value L is compared with a threshold value TH. In order to represent 0 to 255 by binary data, a threshold value used here is set to 127. According to the comparison, a result described below is obtained.

L>TH (127) ... 1 (record)
L≤TH (127) ... 0 (non-record)

Then, in accordance with a determination result, a quantization representative value V is set as described below.

1 (record) ... 255
0 (non-record) ... 0

By setting the quantization representative value V as described above, an error E (=L−V) generated is distributed to pixels around the target pixel. More specifically, in accordance with the proportion of distribution factors illustrated in FIG. 7, the error is distributed to pixels positioned on the lower left, below, lower right, and right of the target pixel. In the case where a distribution target pixel exists only on the right of the target pixel, the error is directly added to the right pixel. Then, the pixel on the right of the target pixel turns to a new target pixel, a value La obtained by adding a distributed error Ea(E×7/16) to the signal value L of the new target pixel is compared with a threshold value. Therefore, a determination result described below is obtained.

La>TH (127) . . . 1 (record)
La≤TH (127) . . . 0 (non-record)

Since the error Ea of the luminance value with respect to the quantization representative value V is within a range from −127 to +127, the value La to be compared with the threshold value is within a range from −127 to +382.

By performing the above processing for all the pixels in the lower right direction of the image for all the ink colors C, M, Y, and K, 1-bit ink color data (recording signal) that can be recorded can be obtained.

The thus generated ink color data is transmitted to the printing engine, and the printing engine determines, in accordance the ink color data, whether or not ink ejection is necessary. Then, when ink is ejected from the recording head 101 in accordance with a result of the determination, an image corresponding to the JPEG image data input to the input interface 201 is recorded onto the recording medium.

The example in which the error diffusion processing is performed using a distribution factor illustrated in FIG. 7 has been explained above. In this embodiment, however, a distribution factor to be used for image data is determined from various distribution factors, which will be described later with reference to FIGS. 14A, 14B, and 14C, in accordance with the degree of compression at the time when the image data was compressed. The gradation conversion portion 308 performs the error diffusion processing using the distribution factor determined as described above. Hereinafter, the details of a process performed by the compression degree calculation portion 309 and a parameter determination portion 310 will be explained.

The compression degree calculation portion 309 calculates the degree of compression on the basis of the quantization table that was used for compression and which is acquired by the attached information acquisition portion 301. More specifically, the similarity between the quantization table and each of quantization tables corresponding to compression Q factors illustrated in FIGS. 10A, 10B, and 10C recorded in advance. In each of the quantization tables recorded in advance, a Q factor representing the degree of compression is set. A method for determining a Q factor of a quantization table with a high similarity as the degree of compression, will be explained below.

FIGS. 10A, 10B, and 10C are diagrams illustrating examples of quantization tables stored in advance in the printing apparatus. In FIG. 10A, the Q factor is 50. In FIG. 10B, the Q factor is 75. In FIG. 10C, the Q factor is 90. These quantization tables are set in such a manner that as the Q factor increases, the degree of compression decreases (the compression ratio becomes lower), and degradation caused by compression and expansion decreases. These quantization tables are stored in the ROM 204.

The compression degree calculation portion 309 compares the quantization table of the JPEG data acquired by the attached information acquisition portion 301 with each of the quantization tables illustrated in FIGS. 10A, 10B, and 10C, and determines the similarity between them. As illustrated in FIGS. 10A to 10C, a JPEG quantization table holds 8×8 (=64) tables for luminance and color difference. As represented by Equation 3, the difference between the quantization table of the JPEG image to be printed and each of the plurality of quantization tables illustrated in FIGS. 10A to 10C, which are stored in advance in the ROM 204, is calculated.

$$R = \sum_{y=0}^{7}\sum_{x=0}^{7}\{Ya(x,y) - Yb(x,y)\} + \sum_{y=0}^{7}\sum_{x=0}^{7}\{Cba(x,y) - Cbb(x,y)\} + \sum_{y=0}^{7}\sum_{x=0}^{7}\{Cra(x,y) - Crb(x,y)\} \quad \text{Equation 3}$$

In Equation 3, Ya(x,y), Cba(x,y), and Cra(x,y) indicate quantization values of the luminance Y, the color difference Cb, and the color difference Cr of a quantization factor linked with a Q factor and held in advance at a coordinate position (x,y). In addition, Yb(x,y), Cbb(x,y), and Crb(x,y) indicate the luminance Y, the color difference Cb, and the color difference Cr obtained from target JPEG attached information at the coordinate position (x,y).

Then, the Q factor at the time when the JPEG data was compressed is determined on the basis of the similarities corresponding to the quantization tables illustrated in FIGS. 10A to 10C and the Q factors corresponding to the individual quantization tables. Accordingly, although the Q factors of the quantization tables illustrated in FIGS. 10A to 10C are discrete from one another, values of a wide range from less than 50 to more than 90 can be determined as a Q factor of the JPEG data to be printed.

The method for calculating the degree of compression is not limited to the above. The degree of compression may be calculated by weighting a quantization table. Weight is set as a similarity R for the difference between quantization tables, as in Equation 4. For example, a weight Wy for the difference in the luminance between quantization tables is set to be high, and weights Wcb and Wcr for the differences in the color differences between the quantization tables are set to be low. This is because regarding the difference in density of pixel data, luminance is visually more conspicuous than color difference. A method for giving priority to a smaller difference in luminance between the quantization tables may be employed.

$$R = \sum_{y=0}^{7}\sum_{x=0}^{7}\{Ya(x,y) - Yb(x,y)\} \times Wy + \sum_{y=0}^{7}\sum_{x=0}^{7}\{Cba(x,y) - Cbb(x,y)\} \times Wcb + \sum_{y=0}^{7}\sum_{x=0}^{7}\{Cra(x,y) - Crb(x,y)\} \times Wcr \quad \text{Equation 4}$$

For example, weighting may be performed in 64 quantization tables. In any case, various methods may be adopted as long as the degree of compression of image data can be expressed.

The smallest similarity R is selected, and the Q factor of the selected similarity R is defined as the degree of compression. Although Q factors are provided in three stages in this embodiment, a larger number of stages may be provided. Furthermore, more detailed Q factors may be set based on the value of the similarity R.

The degree of compression calculated as described above by the compression degree calculation portion 309 is transmitted to the parameter determination portion 310.

The parameter determination portion 310 determines a parameter on the basis of the degree of compression calculated by the compression degree calculation portion 309. More specifically, the parameter determination portion 310 determines a distribution factor in error diffusion processing performed by the gradation conversion portion 308. The details of the determination process will be described with reference to a flowchart of FIG. 9.

Figure 9:
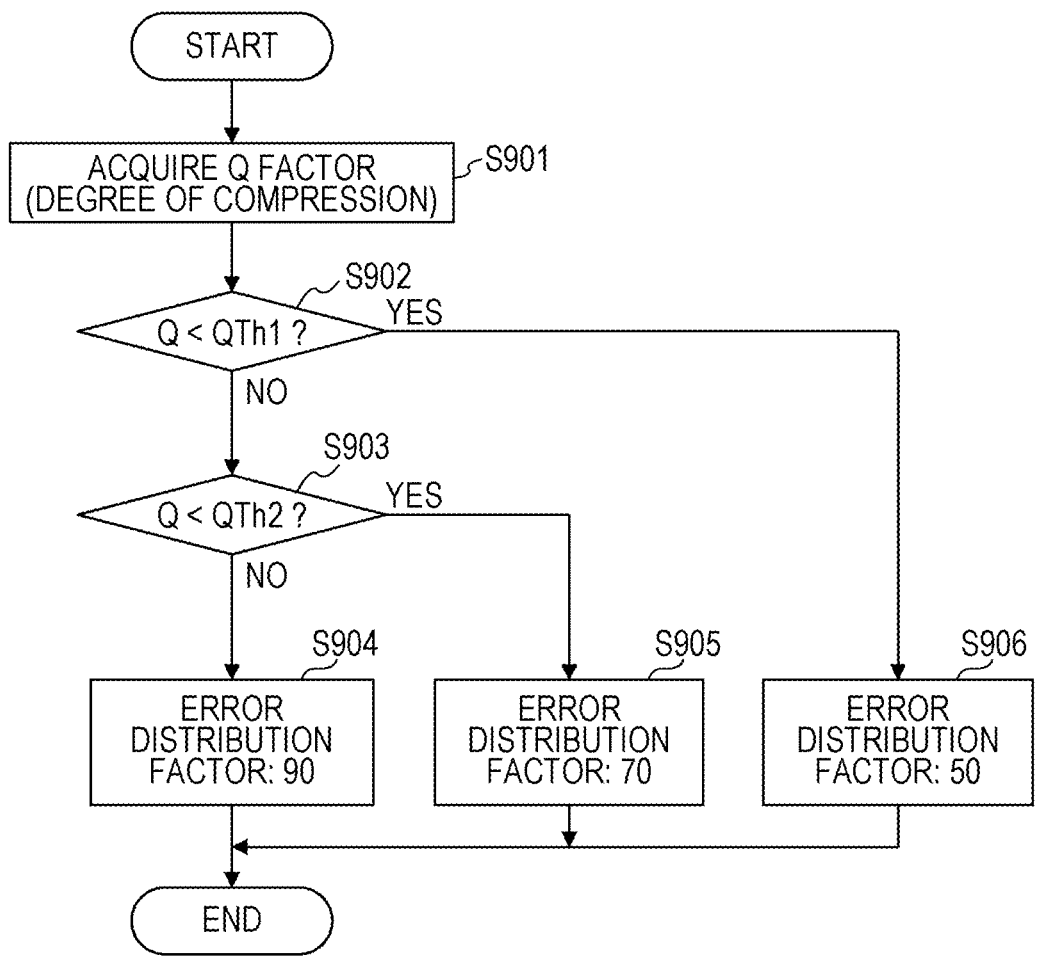
FIG. 9 is a flowchart illustrating an example of a process performed by a parameter determination portion.

FIG. 9 is a flowchart illustrating an example of a process performed by the parameter determination portion 310. A program corresponding to the process illustrated in FIG. 9 is stored as a program module of the parameter determination portion 310 in the ROM 204, and the process illustrated in FIG. 9 is implemented when the CPU 202 executes the program.

Figure 14A:
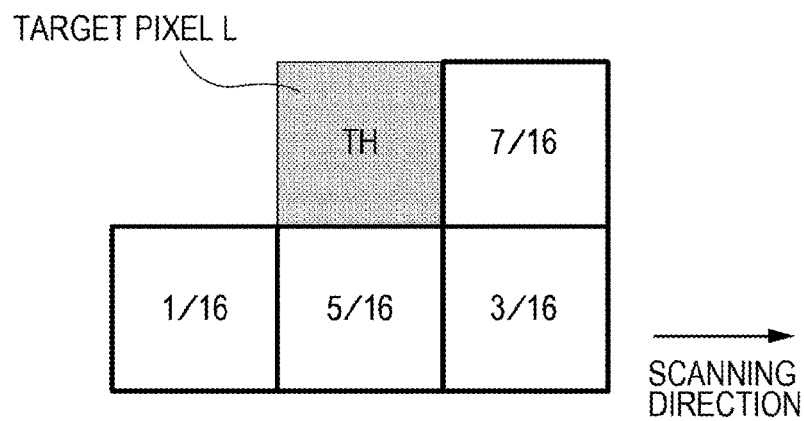
FIGS. 14A, 14B, and 14C are diagrams illustrating error distribution factors serving as selection candidates.
Figure 14B:
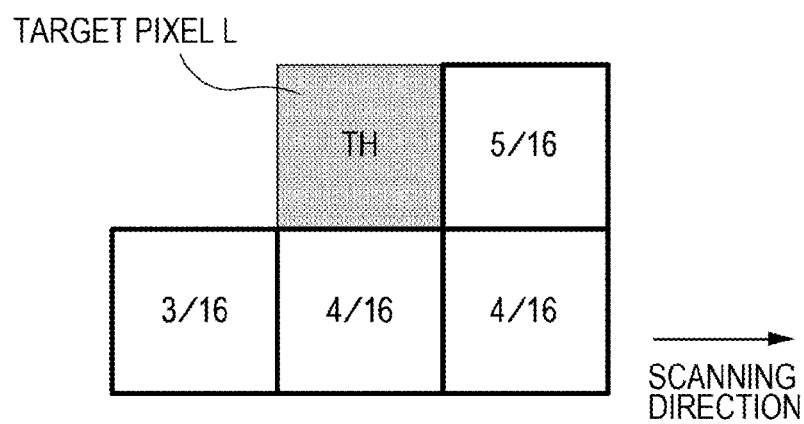
Figure 14C:
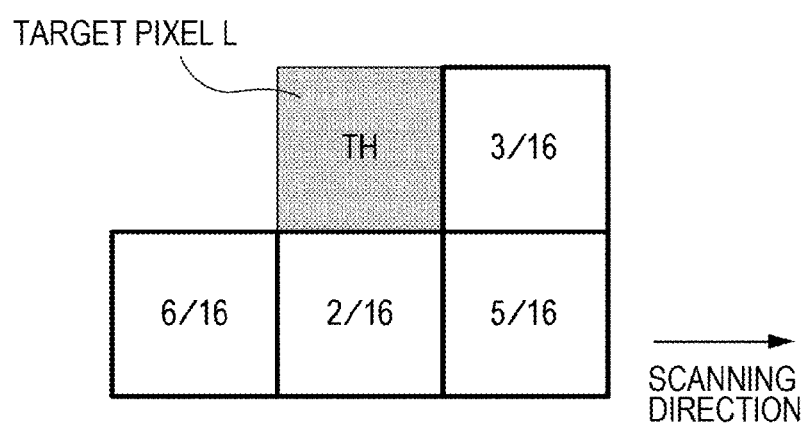

FIGS. 14A, 14B, and 14C are diagrams illustrating examples of error distribution factors serving as selection candidates in the process illustrated in FIG. 9. The error distribution factors are stored in the ROM 204. When the CPU 202 executes the program corresponding to the parameter determination portion 310, an error distribution factor corresponding to a Q factor is determined, and the determined factor is read from the ROM. The details of the error distribution factors will be described later.

In S901, the CPU 202 acquires the Q factor (degree of compression) obtained by the compression degree calculation portion 309. As described above, it can be determined that as the Q factor increases, the degree of compression decreases, and degradation of the image is less likely to be caused by compression and expansion. In contrast, it can be determined that as the Q factor decreases, the degree of compression increases, and degradation of the image is more likely to be caused by compression and expansion.

In S902, the CPU 202 determines whether the Q factor acquired in S901 is smaller than a threshold value QTh1. In FIG. 9, as an example of QTh1, the Q factor is set to 50. When it is determined in S902 that the Q factor is not smaller than QTh1, the process proceeds to S903.

In S903, the CPU 202 determines whether the Q factor acquired in S901 is smaller than a threshold value QTh2. In FIG. 9, as an example of QTh2, the Q factor is set to 70.

In accordance with a result of the determination in S902 or S903 described above, a distribution factor in the error diffusion processing is determined. More specifically, when it is determined in S903 that the Q factor is not smaller than QTh2 (the Q factor is less than or equal to a predetermined degree of compression), the error distribution factor is determined to be 90, as illustrated in FIG. 14A, in S904. When it is determined in S903 that the Q factor is smaller than QTh2 (the Q factor is more than the predetermined degree of compression), the error distribution factor is determined to be 70, as illustrated in FIG. 14B, in S905. When it is determined in S902 that the Q factor is less than QTh1, the error distribution factor is determined to be 50, as illustrated in FIG. 14C, in S906.

Although regarding the comparison with respect to the predetermined two threshold values, a distribution factor corresponding to a Q factor of an image to be printed is selected from among three error distribution factors in the example of FIG. 9, the present invention is not limited to this. For example, by preparing a table representing an error distribution factor corresponding to a Q factor and referring to the table, an error distribution factor corresponding to the Q factor of the image data may be acquired. Furthermore, the number of distribution factors as selection candidates is not necessarily three. A greater number of error distribution factors may be prepared.

Next, an error distribution factor determined in FIG. 9 will be explained.

First, the error distribution factor illustrated in FIG. 14A is the same as that in FIG. 7 and is called a Floyd factor. Even in the case of a binary gradation level or the like, this factor exhibits a high sensitivity in the visual characteristics and achieves a reduction of a low-frequency component. As a result, a suitable image quality is achieved. Therefore, this factor is widely used. However, in the error diffusion processing with respect to image data which has been compressed and expanded in the lossy compression method, mosquito noise may be enhanced in a printing result due to the reasons described below.

The characteristics of mosquito noise will now be explained. As described above, mosquito noise is generated when data of a high-frequency component is eliminated by lossy compression processing. Furthermore, an image to be printed is data in which, for example, pixels are arranged in a two dimensional space of X and Y directions. For simplification of explanation, an explanation will be provided using one-dimensional data.

Figure 11A:
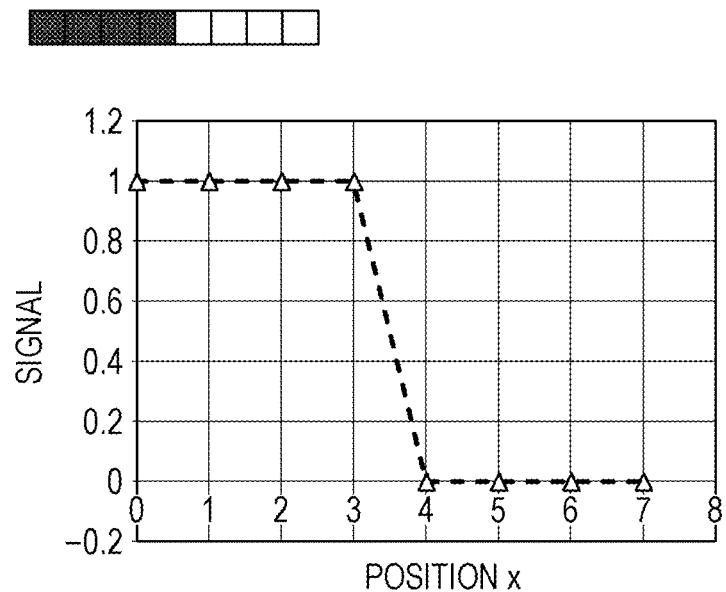
FIGS. 11A and 11B are graphs illustrating signal values corresponding to pixels arranged one-dimensionally.
Figure 11B:
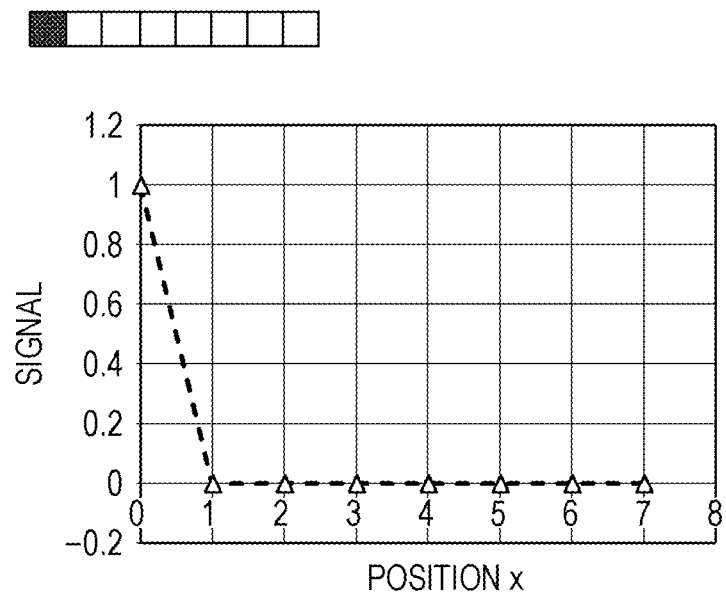

FIGS. 11A and 11B are graphs illustrating signal values corresponding to pixels arranged one-dimensionally.

In FIG. 11A, among eight pixels arranged consecutively, left four pixels represent black (luminance value: 0) and right four pixels represent white (luminance value: 255). In the examples of FIGS. 11A and 11B, black pixels (luminance value: 0) have a signal value "1", and white pixels (luminance value: 255) have a signal value "0". DCT represented by Equation 5 is applied to the above data. After that, quantization processing and inverse DCT are performed.

$$F(u) = \sqrt{\frac{2}{N}} C(u) \sum_{x=0}^{N-1} f(x) \cos\left\{\frac{\pi(2x+1)u}{2N}\right\}$$ Equation 5

$$f(x) = \sqrt{\frac{2}{N}} \sum_{u=0}^{N-1} C(u) F(u) \cos\left\{\frac{\pi(2x+1)u}{2N}\right\}$$

In Equation 5, when u is equal to 0, $$C(u) = \frac{1}{\sqrt{2}},$$

and When u is not equal to 0, $C(u)=1$.

FIGS. 12A-1, 12A-2, 12B-1, and 12B-2 are graphs illustrating results of processing for pixels arranged one-dimensionally. FIG. 12A-1 illustrates a processing result of DCT for FIG. 11A. In FIG. 12A-1, a signal value is expressed by waves (solid line), and signal values (black points) which are not degraded are reproduced. An example in which a high-frequency component in the waveform is degraded by quantization processing is illustrated in FIG. 12A-2. A lower-frequency waveform than that illustrated in FIG. 12A-1 is obtained. As a result, a portion in which the original data cannot be reproduced appears. In particular, at a position x of 7, a signal value which originally represents white becomes a value not representing white. In the case where inverse DCT is performed in such a state to convert data of a frequency component into a signal value, a portion which originally represents white in the original image before compression becomes mosquito noise (arrows in FIG. 12A-1).

Another example of a processing result will be explained below with reference to FIG. 11B. In FIG. 11B, only one pixel at the left end represents black (signal value: 1) and the other seven pixels represent white (signal value: 0). A processing result in the case where DCT is performed in this case is illustrated in FIG. 12B-1. Furthermore, a result obtained in the case where a high-frequency component is eliminated by quantization processing is illustrated in FIG. 12B-2. In the case where inverse DCT is performed for data illustrated in FIG. 12B-2, mosquito noise is generated at two pixels at positions x of 4 and 7.

An example of a one-dimensional image has been described above. However, for example, in the case where JPEG compression and expansion processing is performed for a two-dimensional image, DCT, quantization processing, and inverse DCT are performed in units of minimum coded units (MCUs): 8×8 pixels, for the image.

Figure 13A:
FIGS. 13A and 13B are diagrams illustrating an example of mosquito noise generated around a character portion in a two-dimensional image.
Figure 13B:
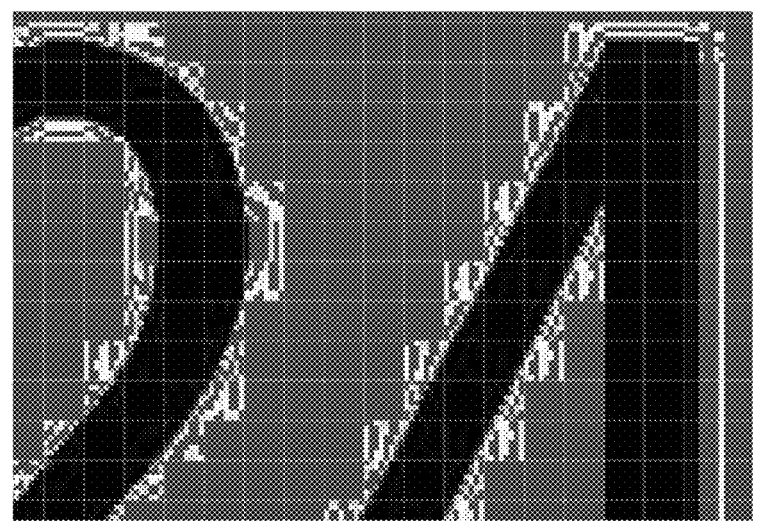

FIGS. 13A and 13B are diagrams illustrating an example of mosquito noise generated around a character portion in a two-dimensional image. In FIGS. 13A and 13B, images obtained by performing JPEG compression and expansion for an image containing a figure "24" are illustrated. As is clear from FIG. 13A, gray noise is generated around the character. In FIG. 13B, in order to clarify mosquito noise illustrated in FIG. 13A for explanation, white portions in FIG. 13A are colored in gray and lines representing MCUs are added. As is clear from FIG. 13B, mosquito noise has the following characteristics: (1) in a white region which is away from data not representing white, such as a black character, mosquito noise is less likely to occur; (2) occurrence or non-occurrence of noise and how noise occurs differ from MCU to MCU; and (3) pixels at which noise occurs are likely to be aligned vertically or horizontally.

Regarding (1), for example, in the case where all the pixels contained in an MCU represent white in the original image before compression, no high-frequency component is contained. Therefore, even if JPEG compression and expansion are performed, high-frequency components are not eliminated, and mosquito noise is thus less likely to occur. Accordingly, as illustrated in FIG. 13A, degradation does not occur in a portion representing only white. As is clear from FIG. 13B, noise represented as white does not included, and the white portion is expressed in gray.

Furthermore, mosquito noise does not depend on the distance from a character, and occurs when a character portion exists in an MCU. Therefore, even if the distance from a character is short, when a character portion does not exist in the MCU, mosquito noise does not occur, which is apparent from FIG. 13B.

Furthermore, also in the case where a large amount of data of black characters or the like are contained in an MCU, due to a small amount of high-frequency component, mosquito noise is less likely to occur.

Regarding (2), as explained above for (1), occurrence of mosquito noise depends on the position of black pixels and the proportion of the black pixels in the MCU. Therefore, occurrence or non-occurrence of mosquito noise and the position and proportion of the mosquito noise differ from MCU to MCU, depending on the position and proportion of the black pixels.

Furthermore, regarding (3) as is clear from FIG. 13B, pixels corresponding to mosquito noise are aligned vertically or horizontally in an MCU. As is apparent from FIGS. 12A-2 and 12B-2 corresponding to an one-dimensional image described above, mosquito noise often occurs in end portions of a specific range (for example, lines of 8 pixels). In the case of a two-dimensional image, since an MCU is rectangular and mosquito noise in the one-dimensional image is likely to occur in each line of an MCU, pixels of mosquito noise are aligned vertically or horizontally in a consecutive manner in an end portion of the MCU.

Furthermore, for example, like a right end of "4" in the image illustrated in FIGS. 13A and 13B, in an MCU including parallel straight lines in a vertical (or horizontal) direction in the image, mosquito noise tends to be aligned vertically (or horizontally), as illustrated in FIG. 13B. This is because black pixels are distributed uniformly in individual lines in an MCU. That is, in the case where black pixels are distributed uniformly in individual lines, mosquito noise for a one-dimensional image as illustrated in FIGS. 12A to 12D tends to occur in the individual lines. Therefore, at positions (for example, positions in the X direction) of pixels in a plurality of lines, pixels in the same positions become mosquito noise. In an MCU of a two-dimensional image, these lines are aligned, and mosquito noise is thus aligned vertically (or horizontally).

Furthermore, as is clear from FIGS. 13A and 13B, even if an MCU includes an oblique line part of a character, mosquito noise occurs such that the mosquito noise is aligned vertically or horizontally. Even for an oblique line part, the distribution of black pixels are similar among adjoining lines in an MCU. Therefore, due to the reason mentioned above, in the case where a target pixel is mosquito noise, mosquito noise often occurs at pixels positioned vertically and horizontally relative to the target pixel. As a line is positioned closer to a line including a target pixel in an MCU, the distribution of black pixels becomes more similar to that of the line including the target pixel. Therefore, in the case where the target pixel is mosquito noise, pixels of mosquito noise are often aligned consecutively to the mosquito noise.

The error distribution factors illustrated in FIGS. 14B and 14C are set according to the tendency of occurrence of mosquito noise illustrated in FIGS. 13A and 13B. Hereinafter, the details will be described.

In the case where a pixel (target pixel) for which an error generated when the number of gradation levels is reduced in the error diffusion processing is calculated is a pixel of mosquito noise, multi-valued data of the pixel often has a pixel value corresponding to gray. Therefore, even if a result of the comparison between the multi-valued data and a threshold value (in the case where binarization processing is performed on multi-valued data of 0 to 255, for example, 127) is 0 (non-record), error occurs.

A case where in distribution of the error to pixels around a target pixel by error diffusion processing, the error is distributed more to pixels positioned horizontally and vertically relative to the target pixel, will be considered. In this case, as illustrated in FIGS. 13A and 13B, pixels aligned horizontally and vertically relative to the target pixel (pixel of mosquito noise) are often mosquito noise. Therefore, when error is distributed more to pixels positioned vertically and horizontally relative to the target pixel, even if multi-valued data of mosquito noise aligned horizontally and vertically relative to the target pixel is less than or equal to the threshold value, addition of the error may cause the multi-valued data to exceed the threshold value. Therefore, a result of 1 (record) is obtained, and the probability of forming dots of mosquito in printing increases.

In the case of the distribution factors illustrated in FIGS. 14B and 14C, the distribution factors of pixels positioned vertically and horizontally relative to the target pixel L are set to be smaller than the Floyd factor illustrated in FIG. 14A. Therefore, even if the target pixel is mosquito noise, a smaller amount of error is added to mosquito noise which is highly likely to be generated at positions vertical and horizontal to the mosquito noise at the target pixel, and the mosquito noise is therefore prevented from being printed.

However, even in the case of a lower gradation level, such as binary data, the Floyd factor achieves a sensitivity in the visual characteristics and is thus widely used. Therefore, in this embodiment, as illustrated in FIG. 9, in the case where the Q factor of image data to be printed is equal to or more than the threshold value QTh2 (the case where the degree of compression is low and noise is less likely to occur), the Floyd factor is used.

In contrast, in the case where the Q factor is less than the threshold value QTh2 (the case where the degree of compression is high and noise is likely to occur), as illustrated in FIGS. 14B and 14C, a factor for which distribution factors for pixels positioned vertically and horizontally relative to the target pixel are small is used.

As illustrated in FIG. 9, when the Q factor is equal to or more than QTh1 and less than QTh2 (QTh1<QTh2), the error distribution factor 70 illustrated in FIG. 14B is used, and when the Q factor is less than QTh1, the error distribution factor 50 illustrated in FIG. 14C is used. In FIGS. 14B and 14C, the distribution factors for pixels positioned vertically and horizontally relative to the target pixel decrease in a stepwise manner from the error distribution factor 70 to the error distribution factor 50. That is, in this embodiment, a distribution factor is determined in such a manner that as the Q factor decreases (the degree of compression increases and mosquito noise becomes more likely to occur), the distribution factors for pixels positioned vertically and horizontally relative to the pixel target decrease in a stepwise manner.

The distribution factors for pixels positioned vertically and horizontally relative to the pixel of target are not necessarily set to be small as in FIGS. 14B and 14. A smaller distribution factor may be set for only one of pixels positioned vertically and horizontally relative to the pixel of target. That is, distribution factors for pixels positioned vertically and/or horizontally relative to the pixel of target are set to be small.

Figure 15A:
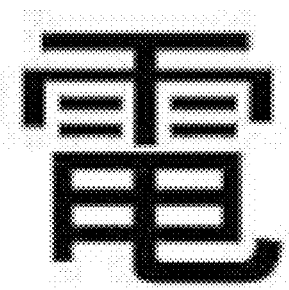
FIGS. 15A, 15B, and 15C are diagrams illustrating images on which error diffusion processing has been performed using distribution factors determined by a process according to an embodiment.
Figure 15B:
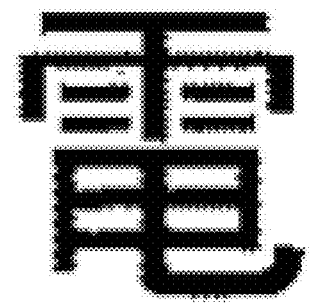
Figure 15C:
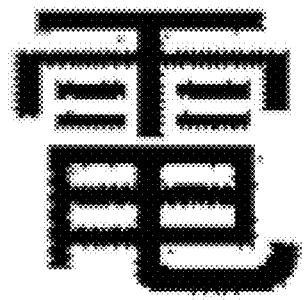

FIGS. 15A, 15B, and 15C are diagrams illustrating images on which error diffusion processing has been performed using distribution factors determined by a process according to an embodiment. FIG. 15A illustrates an image of compressed and expanded multi-valued data before error diffusion processing is performed, and mosquito noise occurs around a character. Furthermore, the above compression is performed with a high degree of compression so that the Q factor becomes less than the threshold value QTh1. Therefore, by the process illustrated in FIG. 9 by the parameter determination portion 310, an error distribution factor: 50 is determined as a distribution factor to be used for error diffusion processing.

An image obtained by error diffusion processing using the distribution factor determined as described above is illustrated in FIG. 15B. Furthermore, for comparison with FIG. 15B, an image to which a Floyd factor, that is, an error distribution factor: 90, is applied, is illustrated in FIG. 15C.

As is clear from the comparison between FIG. 15B and FIG. 15C, the number of dots appearing around the character in FIG. 15B is smaller than that in FIG. 15C. As a result, in the case where the image illustrated in FIG. 15B is printed, the reproductivity of the character is higher than that in the case of FIG. 15C, and an unnecessary recording agent for printing of mosquito noise is prevented from being used.

In this embodiment, in the processing for determining a distribution factor, distribution factors in three stages corresponding to the Q factor representing the degree of compression are defined as selection candidates. However, the present invention is not limited to this. Distribution factors in a greater number of stages may be prepared. Furthermore, multiple distribution factors as selection candidates are not necessarily prepared. For example, only a Floyd factor may be stored in the ROM 204. In this case, when the Q factor is small (when noise is likely to occur), error diffusion processing may be performed by using a distribution factor obtained by editing the Floyd factor so that the distribution factors for pixels positioned vertically and horizontally relative to the target pixel are small. The processing for determining a distribution factor in this embodiment includes processing for editing a predetermined distribution factor as described above.

Furthermore, in the foregoing embodiment, the case where an error distribution range in the error diffusion processing includes four pixels around a target pixel has been explained. However, error may be distributed to a wider range including a larger number of pixels or a narrow range including a smaller number of pixels.

Figure 16:
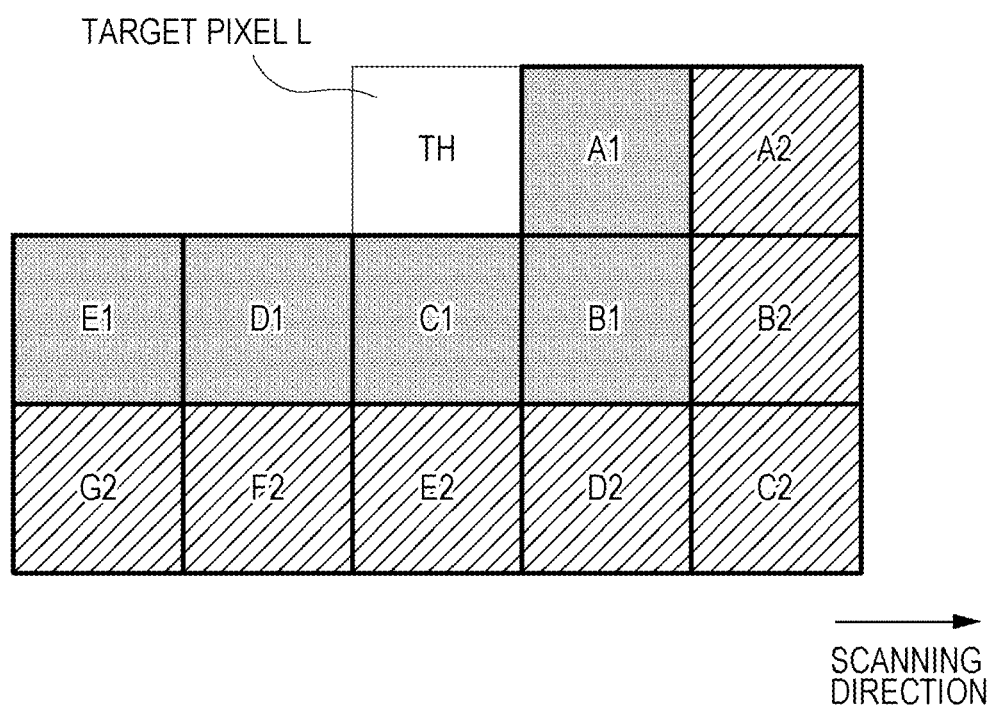
FIG. 16 is a diagram illustrating an example of a distribution factor in the case where an error is distributed to twelve pixels around a target pixel.

FIG. 16 is a diagram illustrating an example of a distribution factor in the case where an error is distributed to twelve pixels around a target pixel. Also in this case, an error distribution factor needs to be prepared taking into consideration the characteristics of mosquito noise illustrated in FIGS. 13A and 13B. As illustrated in FIGS. 14A to 14C, distribution factors for pixels positioned vertically and horizontally relative to the target pixel are set to be small. In addition, when taking the continuity of mosquito noise into consideration, as a pixel is positioned closer to a target pixel of mosquito noise, the possibility of mosquito noise occurring in the pixel increases. Therefore, a smaller factor is allocated to a distribution factor for a pixel positioned closer to the target pixel. Distribution factors A1 to E1 and A2 to G2 illustrated in FIG. 16 are determined in accordance with conditions described below.

1: Among A1 to E1, A1 or/and C1 are set to minimum.
2: Among A2 to G2, A2 or/and E2 are set to minimum.
3: The minimum factor among A2 to G2 is set to be smaller than the minimum factor among A1 to E1. In accordance with the conditions above, a distribution factor for the case where the Q factor is small (the case where the degree of compression is high and noise is likely to occur) is prepared.

As described above, in this embodiment, an error diffusion factor is determined on the basis of the tendency of occurrence of mosquito noise. More specifically, factors for pixels positioned vertically and horizontally relative to a target pixel for a distribution factor in the case where the Q factor is less than the threshold value (the case where the degree of compression is high and noise is likely to occur) are set to be smaller than the case where the Q factor is equal to or more than the threshold value (the case where the degree of compression is low and noise is less likely to occur).

Accordingly, even if mosquito noise occurs when an image compressed in the lossy compression method, such as JPEG, is expanded, a situation in which an error of the noise is added to different mosquito noise by error diffusion processing and the noise is printed, can be prevented. As a result, for example, degradation of the reproductivity of, for example, degradation of the reproductivity of a small character or a complicated shape in an image can be prevented, and the legibility can be maintained.

Regarding the distribution factors illustrated in FIGS. 14B and 14C, an example in which factors for pixels positioned vertically and horizontally relative to a target pixel are set to be smaller than the factor illustrated in FIG. 14A has been explained. However, the present invention is not limited to this. Only factors for pixels positioned vertically or horizontally relative to a target pixel may be set to be smaller. For example, as illustrated in FIGS. 13A and 13B, in the case of an MCU including a vertical line, mosquito noise is likely to be aligned vertically, and in the case of an MCU including a horizontal line, mosquito noise is likely to be aligned horizontally. Therefore, for example, an expanded image is analyzed. When the image includes a large number of vertical lines, only factors for pixels positioned vertically relative to the target pixel may be set to be smaller, and when the image includes a large number of horizontal lines, only factors for pixels positioned horizontally relative to the target pixel may be set to be smaller.

Next, an example in which an error diffusion factor is determined taking into consideration processing for rotating an image on which lossy compression and expansion have been performed, will be described. As explained above with reference to FIGS. 13A and 13B, mosquito noise is likely to be aligned vertically and horizontally.

However, in the case where rotation processing is performed for a compressed and expanded image on which error diffusion processing has not been performed, mosquito noise aligned vertically and horizontally in the image is also rotated. In the processing described below, a distribution factor corresponding to the rotational angle in the rotation processing is determined.

For example, when the rotational angle is 0 degrees (no rotation), mosquito noise is aligned vertically and horizontally as illustrated in FIGS. 13A and 13B. Apart from 0 degrees, even in the case of 90 degrees, 180 degrees, and 270 degrees, mosquito noise occurring vertically and horizontally are aligned vertically and horizontally. Therefore, by using distribution factors illustrated in FIGS. 14A to 14C, printing of mosquito noise can be prevented.

However, for example, in the case where the rotational angle is 45 degrees, 135 degrees, 225 degrees, and 315 degrees, mosquito noise aligned vertically and horizontally becomes arranged diagonally.

Figure 17A:
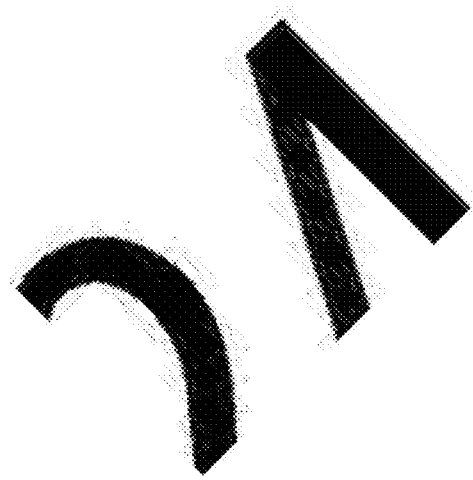
FIGS. 17A and 17B are diagrams illustrating images obtained when the images illustrated in FIGS. 13A and 13B are rotated by 45 degrees anticlockwise.
Figure 17B:
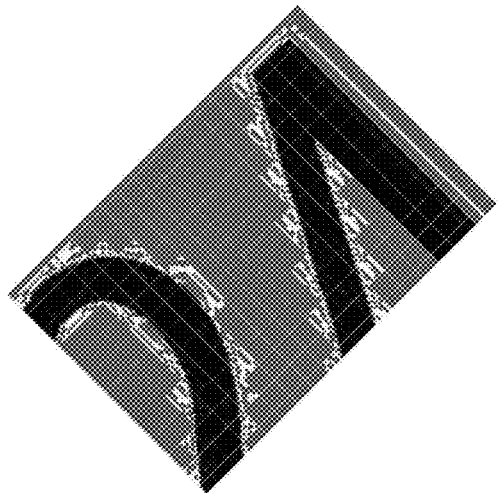

FIGS. 17A and 17B are diagrams illustrating images obtained when the images illustrated in FIGS. 13A and 13B are rotated by 45 degrees anticlockwise. It is apparent from FIGS. 17A and 17B that the mosquito noise aligned vertically and horizontally in the images illustrated in FIGS. 13A and 13B is aligned diagonally. As with FIG. 13B, FIG. 17B is obtained by expressing white portions of the image illustrated in FIG. 17A in gray and adding lines in units of MCUs to the image illustrated in FIG. 17A.

As illustrated in FIGS. 17A and 17B, mosquito noise is also rotated by rotation processing for the image. Therefore, even if the distribution factors illustrated in FIGS. 14B and 14C are applied to this case, mosquito noise is less likely to exist at pixels positioned vertically and horizontally relative to a target pixel, and mosquito noise may not be able to be reduced. Moreover, since factors for lower right and lower left pixels in the case of the distribution factors illustrated in FIGS. 14B and 14C are greater than those illustrated in FIG. 14A, the possibility of mosquito noise being printed may be higher than the case where the distribution factor illustrated in FIG. 14A is used.

A process for determining a distribution factor corresponding to the rotational angle in rotation processing for an image will be described below.

Figure 18:
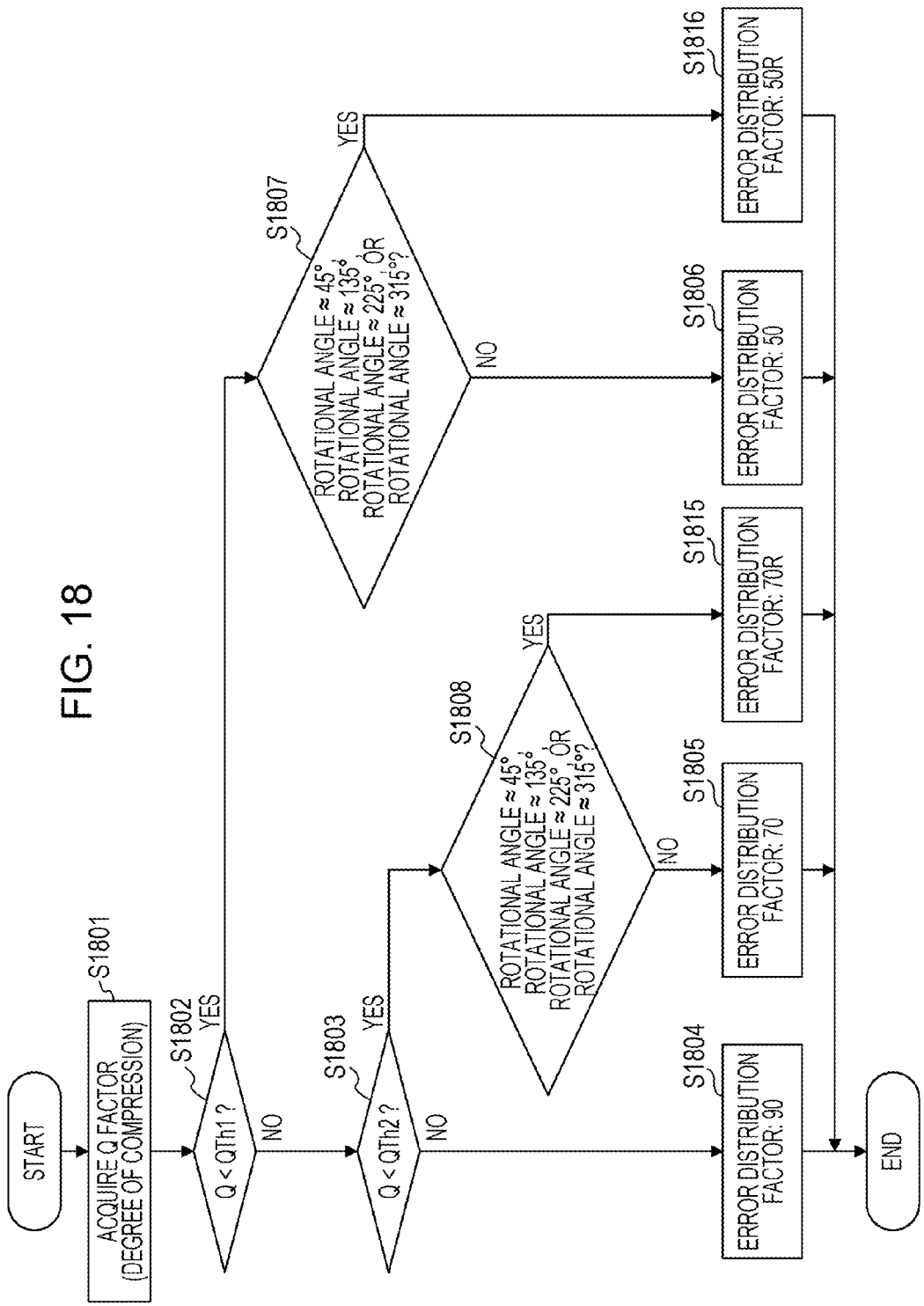
FIG. 18 is a flowchart illustrating an example of a process performed by a parameter determination portion.

FIG. 18 is a flowchart illustrating an example of a process performed by the parameter determination portion 310. Hereinafter, the flowchart illustrated in FIG. 18 will be described.

Processing from S1801 to S1806 are similar to processing from S901 to S906 in FIG. 9. Therefore, the explanation for those similar processing will be omitted.

Processing in S1807 and S1808 is processing for determining the rotational angle of an image. More specifically, in S1807 and S1808, it is determined whether the rotational angle of the image is close to any of 45 degrees, 135 degrees, 225 degrees, and 315 degrees. For example, it is determined whether the rotational angle falls within a range from 5 degrees above to 5 degrees below any of the above predetermined angles.

When the determination result in S1807 is "Yes", it is determined in S1802 that the Q factor is less than QTh1. Therefore, in S1816, the error diffusion factor: 50R which corresponds to the rotational angle and the case where the Q factor is less than QTh1 is selected.

When the determination result in S1808 is "Yes", it is determined in S1802 and S1803 that the Q factor is equal to or more than QTh1 and less than QTh2. Therefore, in S1815, the error diffusion factor: 70R which corresponds to the rotational angle and the case where the Q factor is equal to or more than QTh1 and less than QTh2 is selected.

In the case where the Q factor is equal to or more than the threshold value QTh2, the error distribution factor: 90 illustrated in FIG. 14A is selected in S1804. Similarly, in the case where the Q factor is equal to or more than QTh1 and less than QTh2 and the rotational angle is not close to any of the predetermined rotational angles, the error distribution factor: 70 illustrated in FIG. 14B is selected in S1805. Similarly, in the case where the Q factor is less than QTh1 and the rotational angle is not close to any of the predetermined rotational angles, the error distribution factor: 50 illustrated in FIG. 14C is selected in S1806.

Figure 19A:
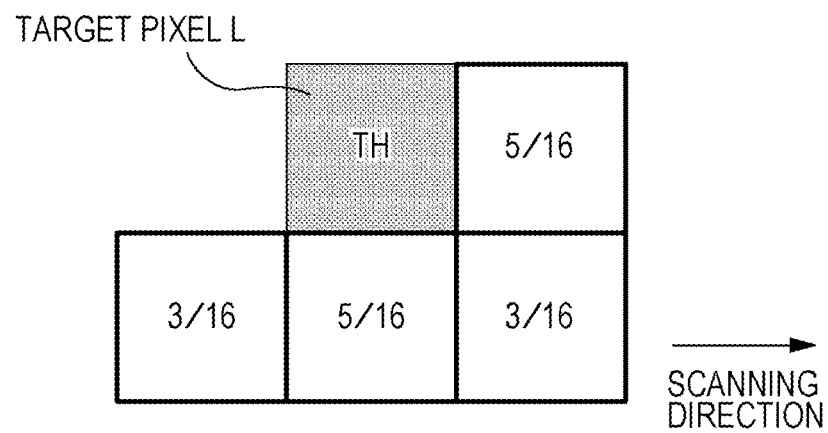
FIGS. 19A and 19B are diagrams illustrating error distribution factors corresponding to a Q factor and the rotational angle of an image.
Figure 19B:
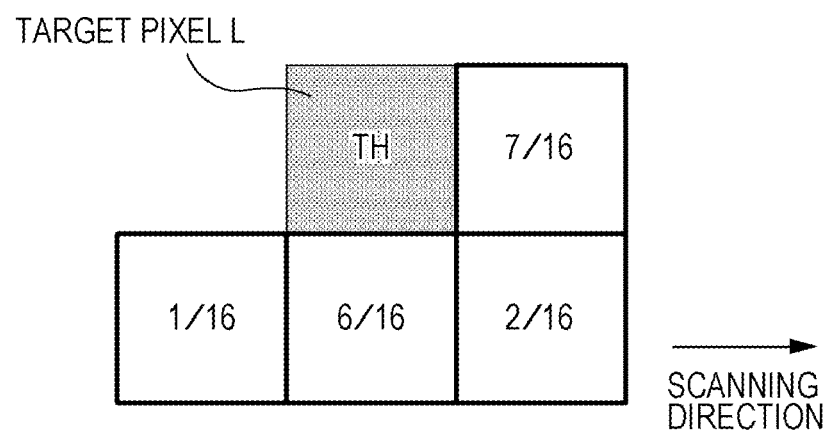

FIGS. 19A and 19B are diagrams illustrating error distribution factors corresponding to a Q factor and the rotational angle of an image.

FIG. 19A illustrates the error distribution factor: 70R selected in S1815. As is clear from the comparison between the error distribution factor: 70R and the error distribution factor: 70 illustrated in FIG. 14B, a factor for a pixel positioned on the lower right of a target pixel in the case of the error distribution factor: 70R is smaller than that in the case of the error distribution factor: 70. In the case where the rotational angle of the image is close to 45 degrees, 135 degrees, 225 degrees, or 315 degrees and the target pixel is mosquito noise, it is highly likely that the pixel positioned on the lower right of the target pixel is also mosquito noise, as illustrated in FIGS. 17A and 17B. Therefore, by reducing the distribution factor for the pixel positioned on the lower right of the target pixel, a situation in which an error in the target pixel is added to the mosquito noise on the lower right of the target pixel and the mosquito noise is printed, can be prevented.

FIG. 19B illustrates the error distribution factor: 50R selected in S1816. As is clear from the comparison with the error distribution factor: 50 illustrated in FIG. 14C, factors for pixels positioned on the lower left and lower right of a target pixel in the case of the error distribution factor: 50R are smaller than those in the case of the error distribution factor: 50. Furthermore, as is clear from the comparison with the error distribution factor: 70R illustrated in FIG. 19A, factors for the pixels positioned on the lower left and lower right of the target pixel in the case of the error distribution factor: 50R are smaller than those in the case of the error distribution factor: 70R.

Therefore, in the case where the Q factor is particularly small (the possibility of noise generation is high) and the rotational angle is close to any of the predetermined angles (the possibility of noise being generated at the pixels positioned on the lower left and lower right of the target pixel is high), factors for the pixels on the lower right and lower left are set to be smaller. Therefore, printing of mosquito noise generated at the pixels on the lower right and lower left of the target pixel can be prevented.

As with the error distribution factors illustrated in FIGS. 19A and 19B, factors for the pixels positioned on the lower right and lower left of the target pixel are smaller than factors for the pixels positioned on the right and below the target pixel in the case of the Floyd error distribution factor: 90 illustrated in FIG. 14A. Therefore, the factors illustrated in FIGS. 19A and 19B are not necessarily selected in S1815 and S1816. The Floyd factor illustrated in FIG. 14A may be selected.

Although, for explanation, rotation at the 45 degrees, 135 degrees, 225 degrees, and 315 degrees has been explained in this embodiment, rotation is not limited to the above. A more detailed angle may be detected, so that a distribution factor can be allocated with a wider error distribution range.

Furthermore, in the case where a plurality of regions of different angles exist in a single image, the above-mentioned determination may be performed for the individual regions, so that error distribution factors can be determined for the individual regions in accordance with the angles corresponding to the regions.

With the process explained above with reference to FIG. 18 and FIGS. 19A and 19B, even in the case where an image which has been lossy-compressed and expanded is rotated, by using an appropriate error diffusion parameter corresponding to the rotational angle, printing of mosquito noise can be prevented.

In the example of FIG. 18, a distribution factor is determined based on both the degree of compression of image data to be printed which has been lossy-compressed and the rotational angle of rotation of the image based on the image data. However, the present invention is not limited to this. A distribution factor may be determined based on only the rotational angle. In this case, for example, in the case where an image is rotated and the rotational angle of the rotation of the image is within a predetermined range for any one of 45 degrees, 135 degrees, 225 degrees, and 315 degrees, a distribution factor with less error distributed to pixels positioned on the lower right and lower left of a pixel of target is used as a distribution factor. More specifically, a distribution factor in which factors for the pixels positioned on the lower right and/or lower left of the pixel of target are smaller than factors for the pixels positioned on the lower right and/or lower left of the pixel of target in the case where an image is not rotated, is used. For example, when rotation is not performed, the Floyd factor is used, and when rotation is performed and the rotational angle is within the predetermined range, the distribution factor illustrated in FIG. 19B is used.

Next, an example in which generation of dots due to mosquito noise is reduced by adjusting a threshold value for a determination of error diffusion processing, will be explained.

Figure 20:
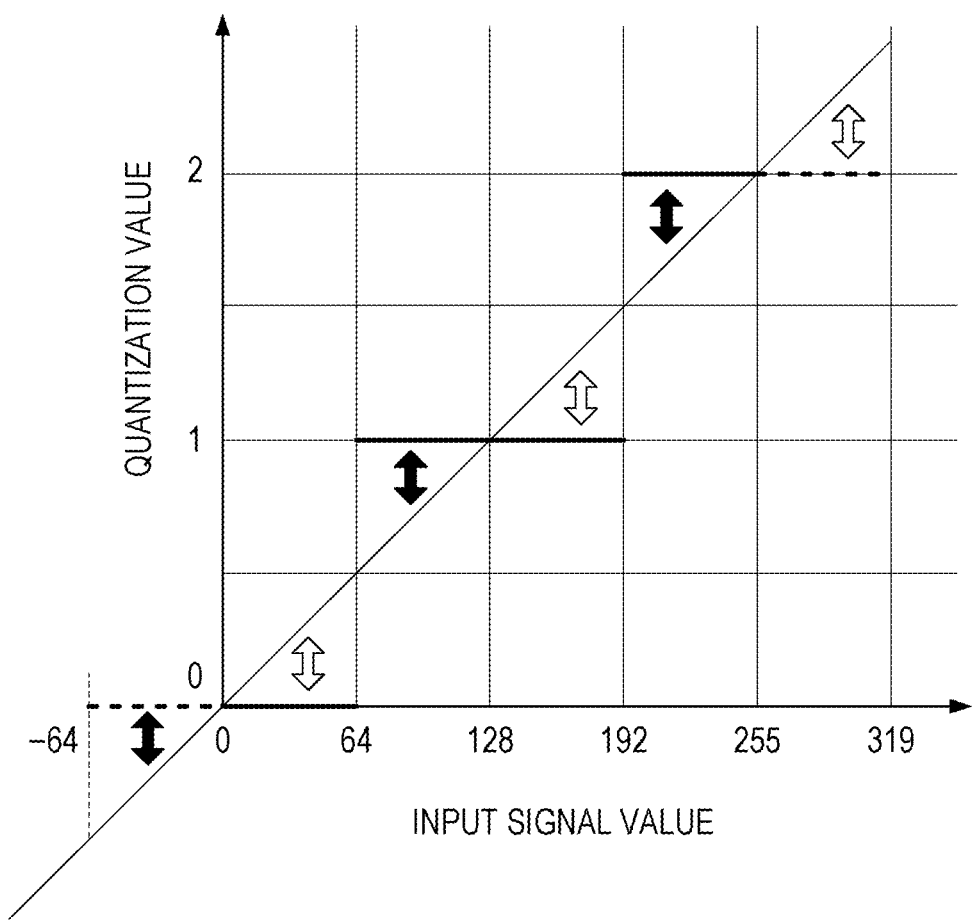
FIG. 20 is a diagram for explaining a process of quantizing an input signal value of 8 bits (0 to 255) to three levels (quantization values: 0, 1, and 2).

First, calculation of an error in the error diffusion processing will be explained. FIG. 20 is a diagram for explaining a process of quantizing an input signal value of 8 bits (0 to 255) to three levels (quantization values: 0, 1, and 2). The error diffusion processing is performed for an image whose luminance value has been converted into a density value. The horizontal axis represents an input signal value (density), which ranges from −64 to 319 in consideration of distribution of error.

In the case where the input signal value is 0, 128, or 255, a quantization value of 0, 1, or 2 is obtained, and error does not occur.

In the case where the input signal value is within a range from −64 to −1, from 64 to 127, or from 192 to 254, a quantization value of 0, 1, or 2 is obtained. When the input signal value is represented by In and the quantization value is represented by QVAL, Error described below occurs.

$$\text{Error} = In - QVAL \times 64 \qquad \text{Equations 6}$$

That is, in the case of the above range, minus error occurs (black arrows in FIG. 20). In contrast, in the case of a range from 1 to 63, from 129 to 191, or from 256 to 319, plus error occurs based on Equation 6 (white arrows in FIG. 20).

In this example, it is assumed that dots are not generated when the quantization value is 0, one dot of ink is ejected when the quantization value is 1, and two dots of ink are ejected when the quantization value is 2. That is, when attention is paid to dot generation in a highlight portion which is relatively bright in an image, the boundary between generation and non-generation of dots is based on a determination as to whether the input signal value exceeds a threshold value 64.

Figure 21:
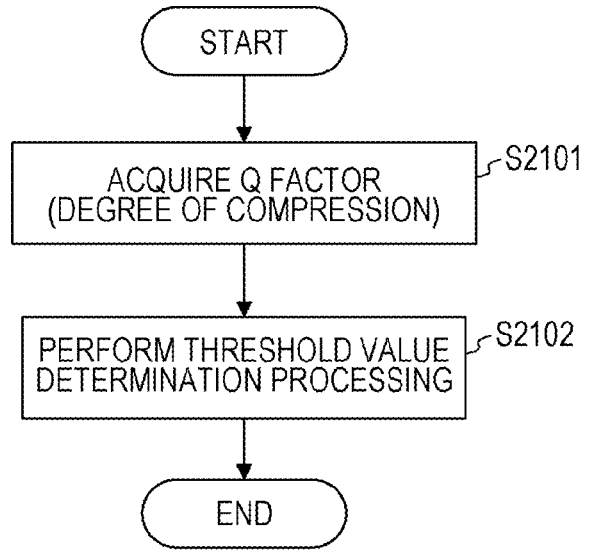
FIG. 21 is a flowchart illustrating an example of a process performed by a parameter determination portion.

In the process explained below, the parameter determination portion 310 determines a threshold value for the above-mentioned error diffusion processing in accordance with a Q factor. Therefore, printing of mosquito noise can be prevented. FIG. 21 is a flowchart illustrating an example of a process performed by the parameter determination portion 310.

In S2101, the degree-of-compression Q factor is acquired. The processing of S2101 is similar to the processing of S901 in FIG. 9.

In S2102, based on the Q factor acquired in S2101, a threshold value to be used for the error diffusion processing is determined.

The gradation conversion portion 308 performs error diffusion processing using the threshold value calculated in S2102 by the parameter determination portion 310.

The processing for determining a threshold value in S2102 in FIG. 21 will be explained in detail with reference to FIG. 22. A process for determining a threshold value for determining 0 or 1 from among three levels (quantization values: 0, 1, and 2) will be explained below.

Figure 22:
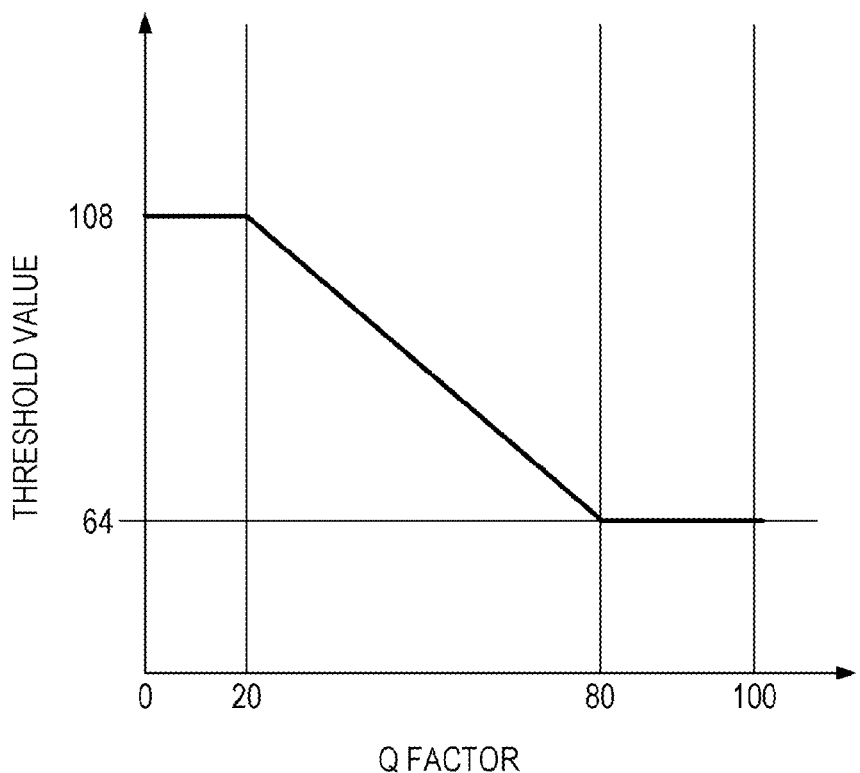
FIG. 22 is a graph illustrating a threshold value determined with respect to a Q factor.

FIG. 22 is a graph illustrating a threshold value determined with respect to a Q factor. In the graph illustrated in FIG. 22, the horizontal axis represents a Q factor and the vertical axis represents a threshold value for error diffusion processing. The threshold value is used for a pixel value obtained by adding an error from another pixel to the density value corresponding to an image. As illustrated in the graph of FIG. 22, in the case where the Q value is 80 or more, it is determined that noise is less likely to occur and a certain image quality or more is ensured. Therefore, the normal threshold value "64" illustrated in FIG. 20 is used. When the Q value within a range from 20 to 80, the threshold value is changed according to the Q value. In this example, the threshold value is set to "108" when the Q value is 20. In the case where the Q value is within a range from 21 to 79, the threshold value decreases linearly as the Q value increases. When the Q value is less than or equal to 20, the threshold is set to "108".

When the threshold value is represented by Qth and the Q factor is represented by Q, they are determined according to the conditions represented by Equation 7.

Equation 7:
When Q equal to or more than 80,
Qth=64.

When Q is equal to or more than 20 and less than 80, $$Qth = \frac{(64-108)}{(80-20)} \times Q + \frac{(80 \times 108 - 20 \times 64)}{(80-20)}$$

When Q is less than 20,
Qth=108.

In the determination of a threshold value, the arithmetic operation using Equation 7 may be performed. Alternatively, a table corresponding to a Q value may be stored in advance so that a threshold value corresponding to the Q value in the table can be referred to.

In any case, the threshold value in the case where the Q factor is small (the case where noise is likely to occur) is set to be greater than a threshold value for a greater Q factor (when noise is less likely to occur).

Referring to FIG. 20, it is apparent that it becomes less likely to print a highlight portion in a multi-valued image as the threshold for determining a quantization value to be "0 (non-record)" or "1 (record")" increases. Therefore, in the process illustrated in FIGS. 21 and 22, by increasing the threshold value when the Q factor is small (when noise is likely to occur), even if mosquito noise occurs, printing of the noise is prevented.

Figure 23A:
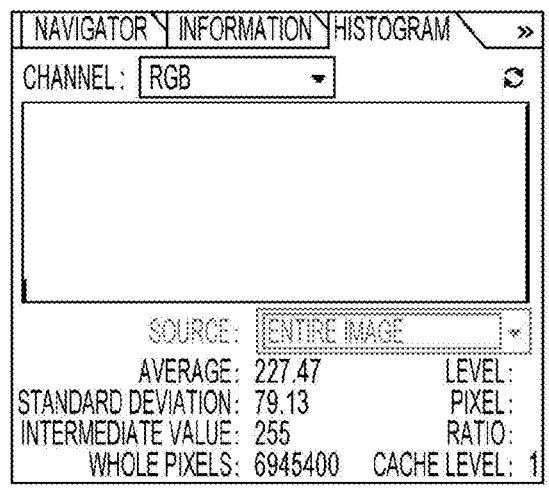
FIGS. 23A, 23B, and 23C are diagrams illustrating histograms of a black character existing in the white background.
Figure 23B:
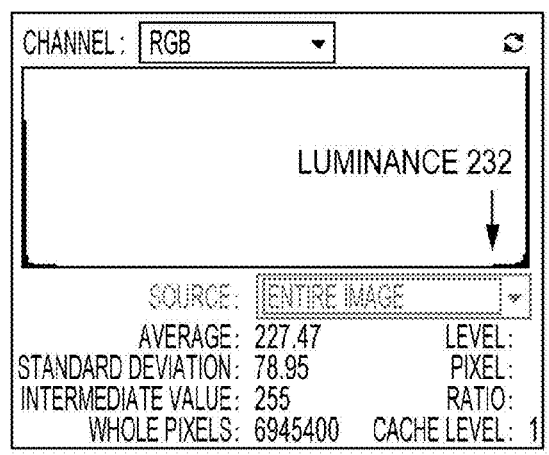
Figure 23C:
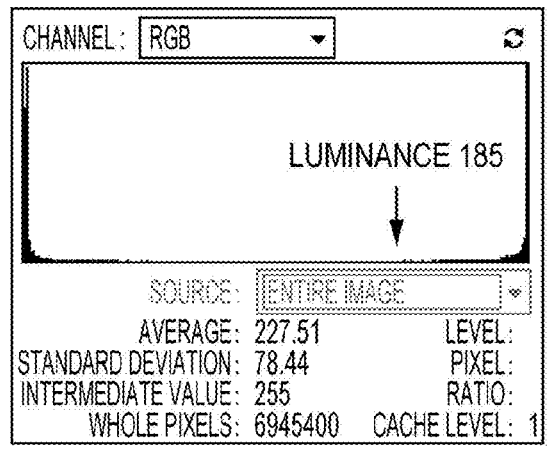

FIGS. 23A, 23B, and 23C are diagrams illustrating histograms of a black character existing in the white background. The horizontal axis represents a luminance. The luminance increases rightward and decreases leftward. The vertical axis represents the number of pixels having the corresponding luminance. FIG. 23A illustrates the original image which has not been degraded by lossy compression and expansion and includes only pixels of white (luminance value: 255) and a black character (luminance value: 0), and therefore pixels of intermediate color is not generated.

FIGS. 23B and 23C illustrate histograms of an image obtained by performing JPEG compression and expansion on the above image, where compression and expansion using quantization tables corresponding to the Q factors 90 and 70, respectively, are performed. Due to the influence of mosquito noise generated by compression and expansion, an intermediate color, which does not originally exist, is generated. The arrows in FIGS. 23B and 23C indicate that the luminance value of the background, which is originally white, decreases and pixels appearing as noise exist. More specifically, noise with a luminance value of 232 to 254 exists when the Q factor is 90, and noise with a luminance value of 185 to 254 exists when the Q factor is 70. As is clear from the above, noise with a lower luminance value (higher density and thicker color) is generated as the Q factor decreases. Based on the calculation from a value obtained by inverting the luminance value into the density value, in the case of FIGS. 23B and 23C, mosquito noise with a density value of 1 to 23 (=255-232) and mosquito noise with a density value of 1 to 70 (=255-185) are generated, respectively. In the case of FIG. 23B, the density value of 1 to 23 is less than the threshold value 64. Thus, except for accumulation of errors, dots are not generated. However in the case of FIG. 23C, mosquito noise with a density value of 1 to 70 is generated, and mosquito noise with a density value of 64 to 70 is equal to or more than the threshold. Therefore, irrespective of whether or not errors are accumulated, a determination result as "1 (1 dot recording)" is obtained, and a dot of mosquito noise is generated.

In accordance with Equation 7, the threshold value is adjusted, and a threshold value of 71 for a smaller Q value is used. Accordingly, by making it difficult to determine the quantization value of noise to be "1 (1 dot recording)" in the case where the Q value is small and noise is likely to occur, generation of dots of mosquito noise can be suppressed.

The error diffusion processing has a characteristic of transmitting error. Therefore, unnecessary dots are not always reduced to 0 even by using the error diffusion processing. However, since the number of pixels which exceed the threshold value for determining the quantization value as "1" can be reduced, the risk of mosquito noise being printed can be reduced. In actuality, it has been confirmed that by using the error diffusion processing, the number of pixels in which dots are generated in white pixels as a result of error diffusion can be reduced to 9% of the case where the normal threshold value "64" is used.

Furthermore, although attention is paid to a white portion in this case, similar effects can be achieved for black portions. That is, a threshold value for determining whether the quantization value is "1" or "2" when the Q value is small (when noise is likely to occur) is set to be smaller than the normal case "192". Accordingly, even if a portion which is originally a black character (luminance value of 0) does not remain black after lossy compression and expansion, it can be easily determined the quantization value to be "2". Therefore, the situation in which the quantization value of the originally black character is determined to be "1" and the originally black character is printed in a thin color can be suppressed.

Figure 24:
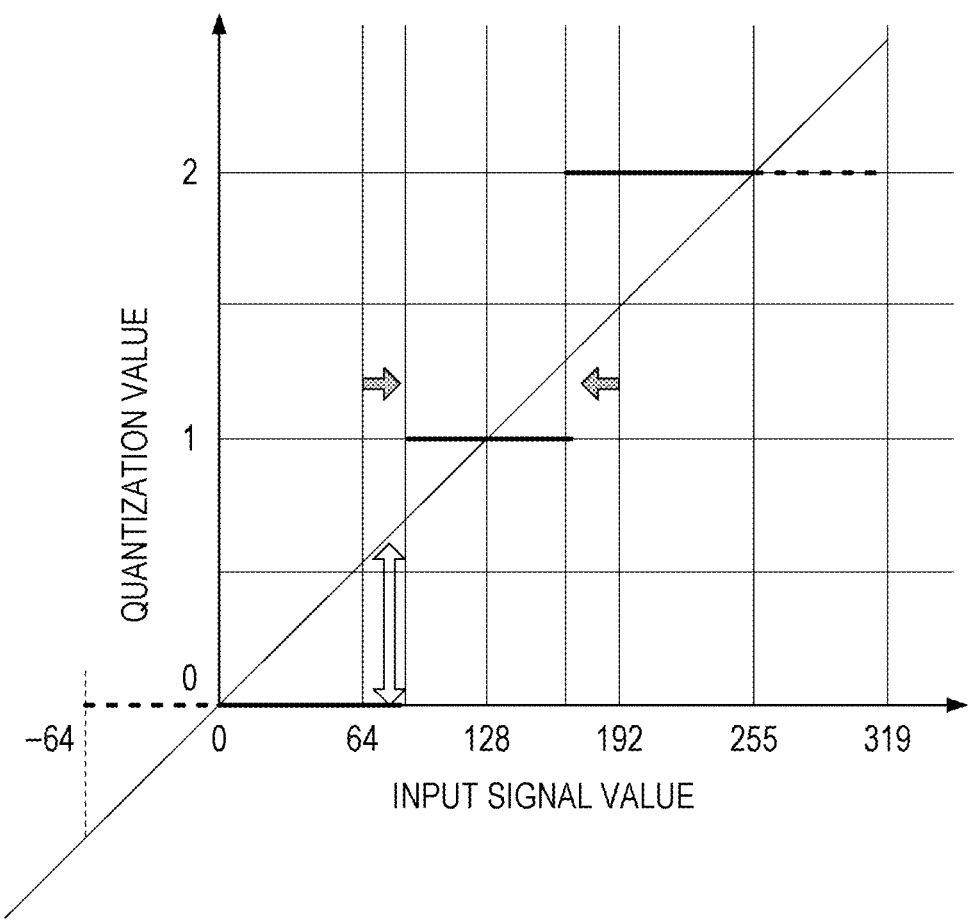
FIG. 24 is a diagram for explaining processing for adjusting a threshold value in the error diffusion processing.

FIG. 24 is a diagram for explaining processing for adjustment a threshold value in the error diffusion processing. As illustrated in FIG. 24, it is desirable that when the Q factor is small (when the degree of compression is high), both the threshold value on the white side and the threshold value on the black side be closer to the central value 128 of an input signal (gray arrows in FIG. 24).

By causing the parameter determination portion 310 to perform the process explained with reference to FIGS. 21, 22, 23A to 23C, and 24, generation of dots against mosquito noise in an image can be suppressed. As a result, for example, degradation of the reproductivity of a small character or a complicated shape can be prevented, and the legibility can be maintained.

In the processes illustrated in FIGS. 9 and 18, an error distribution factor among error diffusion parameters is determined based on a Q factor. In the process illustrated in FIG. 21, among error diffusion parameters, a threshold value for determining a quantization value is determined based on the Q factor. These parameters are independent of each other. Therefore, the processes illustrated in FIGS. 9 and 18 and the process illustrated in FIG. 21 may be combined together.

For example, when attention is paid to an error generated in the error diffusion processing, with the process illustrated in FIG. 21, by changing the threshold value, generation of dots in mosquito noise part can be suppressed. However, with the above process, an error greater than the case where the normal threshold value is used is generated, as indicated by the white arrow in FIG. 24. Thus, by using the process illustrated in FIG. 9 or FIG. 18, the error is distributed while taking into consideration the characteristics of mosquito noise. Therefore, generation of dots against mosquito noise can be suppressed. That is, by using the combination of the process illustrated in FIG. 9 or FIG. 18 and the process illustrating in FIG. 21, the influence of mosquito noise on a printing result can further be reduced.

In the foregoing embodiments, an example in which the printing apparatus operates as an information processing apparatus and acquisition of lossy-compressed image data, expansion processing of the lossy-compressed image data, gradation conversion, and the like illustrated in FIG. 3 are performed in the printing apparatus has been explained. As described above, the above processes are performed in the printing apparatus. Therefore, for example, even if an external apparatus which causes the printing apparatus to perform printing does not perform processing, such as expansion processing for image data or the like, the external apparatus is able to cause the printing apparatus to perform printing of the image data by transmitting lossy-compressed image data.

However, the present invention is not limited to the above configuration. Various apparatuses (devices including a personal computer (PC), a smartphone, a tablet, and a server on a network), which are connected to the printing apparatus and cause the printing apparatus to print an image based on data to be printed, may operate as an information processing apparatus according to an embodiment. In this case, for example, when a printer driver and an application corresponding to the above-described processing are installed into any of the above various apparatuses and the apparatus executes the printer driver and the application program, the above-described processing is implemented. Furthermore, in the various apparatuses, the above-described processing may be performed by the printer driver and the application in a shared manner.

Furthermore, acquisition processing of lossy-compressed image data, expansion processing of the image data, gradation conversion processing, and the like may be performed by cooperation between the various apparatuses and the printing apparatus. For example, processing up to the expansion processing for image data is performed in the various apparatuses. Then, by transmitting the expanded image data and a Q table used for the expansion processing to the printing apparatus, the processes illustrated in FIGS. 9, 18, and 21 may be performed by the printing apparatus. Alternatively, processing for determining parameters (a distribution factor and a threshold value) illustrated in FIGS. 9, 18, and 21 may be performed by the various apparatuses, and the determined parameters may be transmitted to the printing apparatus. Then, the printing apparatus may perform error diffusion processing corresponding to the parameters. Various methods may be adopted as a method for sharing processes between the above various apparatuses and the printing apparatus.

Furthermore, although a Q table is acquired as various parameters used when image data was compressed and the degree of compression of the image data is determined by calculating a Q factor with reference to the acquired Q table in the foregoing embodiments. However, the present invention is not limited this. For example, identification information for identifying the degree of compression may be various types of information, such as information indicating execution or non-execution of compression, information indicating the compression ratio, and information indicating a Q factor as a numerical value.

For example, in the case where information indicating execution or non-execution of compression is acquired, when the acquired information indicates "execution" of compression, processing equivalent to that performed when the Q factor is less than a threshold value may be performed in the above-mentioned processing. In contrast, when the acquired information indicates "non-execution" of compression, processing equivalent to that performed when the Q factor is equal to or more than the threshold value may be performed. Since mosquito noise is generated by compression and expansion in the lossy compression method, information indicating execution or non-execution of lossy compression may be acquired. The case where the information indicates "non-execution" of lossy compression may include a case where lossless compression is performed on image data as well as a case where compression processing is not performed. Even in this case, for example, parameters equivalent to those in the case of "non-execution" of compression processing are set.

Furthermore, in the foregoing embodiments, a distribution factor corresponding to the degree of compression of an image to be printed and a threshold value are set in advance, and at the time of printing, a parameter is determined by selecting a parameter from among the set parameters. However, such parameters are not necessarily set in advance. A new parameter may be determined at the time of printing.

Furthermore, in the processing described above in the foregoing embodiments, when image data to be printed is acquired, it may be determined whether the image data has been compressed in the lossy compression method. After confirming that the image data has been compressed in the lossy compression method, calculation of the degree of compression and determination of various parameters may be performed. In the case where compression is not performed in the lossy compression method, compression is not performed, or compression is performed in a lossless compression method, parameters corresponding to a printing mode or the like or a predetermined parameter may be determined. As a predetermined parameter, for example, a parameter adopted when the Q factor is equal to or more than a threshold value may be used.

In the flowcharts illustrated in FIGS. 9. 18, and 21, after expansion processing for image data is performed, a parameter corresponding to the degree of compression is determined. However, the present invention is not limited to this. Parameter determination processing may be performed before expansion processing, and processing corresponding to a determined parameter may be performed for the image data on which the expansion processing has been performed.

Furthermore, although an example of a JPEG method has been explained in the foregoing embodiments as an example of lossy compression method in image compression, the present invention is not limited to this. Processes according to the foregoing embodiments can be applied to various lossy compression methods.

Furthermore, although an example of data of a still image has been explained as an example of lossy-compressed data to be processed in the foregoing embodiments, the present invention is not limited to this. For example, in the case where a moving image in the MPEG method or the like is displayed or a frame extracted from such a moving image is printed, the number of gradation levels may be reduced. Even in such a case, the gradation conversion processing in the foregoing embodiments may be used.

Furthermore, in the foregoing embodiments, by taking an example of ink ejection as an example in which a recording agent is provided to a recording medium in printing, processing for determining a parameter regarding an ink ejection method in accordance with the degree of compression has been explained. However, the present invention is not limited to this. In the case where toner is provided as a recording agent to a recording medium, processing according to the foregoing embodiments may also be applied to processing for determining a parameter regarding a toner providing method.

Furthermore, although an example of recording paper has been explained in the foregoing embodiments as an example of a printing medium on which an image is printed, the present invention is not limited to this. For example, an overhead projector (OHP) sheet or the like may be used as a printing medium. Furthermore, the printing medium is not necessarily a sheet. The printing medium may be a disk medium, such as a compact disc (CD) or a digital versatile disc (DVD).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Furthermore, a program code for implementing functions of an embodiment may be executed by a single computer (a CPU or an MPU) or may be executed by multiple computers which cooperate with each other. Furthermore, a program code may be executed by a computer or hardware, such as a circuit for implementing the functions of the program code, may be provided. Furthermore, part of the program code may be implemented by hardware and the other parts may be executed by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-265234, filed Dec. 24, 2013, which is hereby incorporated by reference herein in its entirety.

What is claimed is:

1. An information processing apparatus comprising:
an acquisition unit configured to acquire information corresponding to a degree of compression of lossy-compressed image data to be printed;
a determination unit configured to determine, based on the degree of the compression corresponding to the information acquired by the acquisition unit, a parameter to be used when error diffusion processing is performed on the image data to be printed which has been expanded, the parameter being for identifying an error which is to be distributed to a different pixel of the image, and the identified error being identified based on the parameter and an error between a pixel of target included in an image based on the image data and a predetermined threshold value; and
at least one processor configured to function as the acquisition unit and the determination unit,
wherein the determination unit determines a first parameter, in a case where that when the degree of compression corresponding to the information is more than a predetermined degree of compression, and determines a second parameter, in a case where the degree of compression corresponding to the information is less than or equal to the predetermined degree of compression, and
wherein an error to be distributed to pixels positioned vertically and/or horizontally relative to the pixel of target in a case where the first parameter is used is smaller than that in a case where the second parameter is used.

2. The information processing apparatus according to claim 1, wherein the determination unit determines the parameter by selecting a parameter corresponding to the degree of compression from the first parameter and the second parameter stored in a memory.

3. The information processing apparatus according to claim 1, wherein the determination unit determines, in accordance with the degree of compression and a distance between the pixel of target and the different pixel, the parameter for identifying the error which is to be distributed to the different pixel.

4. The information processing apparatus according to claim 1, wherein the information processing apparatus is a printing apparatus.

5. The information processing apparatus according to claim 1, wherein the image data is image data which has been compressed in a Joint Photographic Expert Group format.

6. The information processing apparatus according to claim 1, wherein the image data is expanded based on the information acquired by the acquisition unit.

7. The information processing apparatus according to claim 1, wherein the information corresponding to the degree of compression acquired by the acquisition unit is information used for quantization processing when the data is lossy-compressed.

8. The information processing apparatus according to claim 7, wherein the degree of compression is a Quantization factor corresponding to the quantization processing when the data is lossy-compressed.

9. The information processing apparatus according to claim 1, wherein the determination unit determines, as the parameter, a proportion of a distribution factor for identifying the error.

10. The information processing apparatus according to claim 9, wherein in a case where the degree of compression is more than the predetermined degree of compression, the determination unit determines, as the first parameter, a first proportion, of the distribution factor for the pixels positioned vertically and/or horizontally relative to the pixel of target, which is smaller than a second proportion of the distribution factor which is to be determined as the second parameter and to be used for the pixels positioned vertically and/or horizontally relative to the pixel of target when the degree of compression is less than or equal to the predetermined degree of compression.

11. An information processing method executed by at least one processor, the method comprising:
acquiring information corresponding to a degree of compression of lossy-compressed image data to be printed; and
determining, based on the degree of the compression corresponding to the acquired information, a parameter to be used when error diffusion processing is performed on the image data to be printed which has been expanded, the parameter being for identifying an error which is to be distributed to a different pixel of the image, and the identified error being identified based on the parameter and an error between a pixel of target included in an image based on the image data and a predetermined threshold value, wherein a first parameter is determined, in a case where the degree of compression corresponding to the information is more than a predetermined degree of compression, and a second parameter is determined, in a case where the degree of compression corresponding to the information is less than or equal to the predetermined degree of compression, and, wherein an error to be distributed to pixels positioned vertically and/or horizontally relative to the pixel of target in a case where the first parameter is used is smaller than that in a case where the second parameter is used.

12. The information processing method according to claim 11, wherein the parameter is determined by selecting a parameter corresponding to the degree of compression from among the first parameter and the second parameter stored in a memory.

13. The information processing method according to claim 11, wherein the parameter for identifying the error which is to be distributed to the different pixel, is determined in accordance with the degree of compression and a distance between the pixel of target and the different pixel.

14. The information processing method according to claim 11, wherein the image data is image data which has been compressed in a Joint Photographic Expert Group format.

15. The information processing method according to claim 11, wherein the image data is expanded based on the information acquired in the acquiring.

16. The information processing method according to claim 11, wherein the information corresponding to the degree of compression acquired in the acquiring is information used for quantization processing when the data is lossy-compressed.

17. The information processing method according to claim 11, wherein a proportion of a distribution factor for identifying the error is determined as the parameter.

18. The information processing method according to claim 17, wherein in a case where the degree of compression is more than the predetermined degree of compression, a first proportion of the distribution factor for the pixels positioned vertically and/or horizontally relative to the pixel of target is determined as the first parameter, and wherein the first proportion is smaller than a second proportion of the distribution factor which is to be determined as the second parameter and to be used for the pixels positioned vertically and/or horizontally relative to the pixel of target when the degree of compression is less than or equal to the predetermined degree of compression.

19. An information processing apparatus comprising:
an acquisition unit configured to acquire information corresponding to a degree of compression of lossy-compressed images data to be printed;
a determination unit configured to determine, based on the degree of the compression corresponding to the information acquired by the acquisition unit, a threshold value to be used when error diffusion processing is performed on the image data to be printed which has been expanded, the threshold value being compared with a pixel value corresponding to a pixel of target included in an image based on the image data, and printing of the pixel of target being performed in a case where the pixel value is greater than or equal to the threshold value; and
at least one processor configured to function as the acquisition unit and the determination unit,
wherein in a case where the degree of compression corresponding to the information is more than a predetermined degree of compression, the determination unit determines a first threshold value,
wherein in a case where the degree of compression corresponding to the information is less than or equal to the predetermined degree of compression, the determination unit determined a second threshold value,
wherein each of the first threshold value and the second threshold value is a determination threshold value for determining whether or not to perform printing for a density value corresponding to the pixel of target included in the image on which the error diffusion processing has been performed, and the printing is performed in a case where the density value is greater than the determination threshold value, and
wherein the first threshold value is greater than a second threshold value.

20. An information processing apparatus comprising:
an acquisition unit configured to acquire information corresponding to a rotational angle of rotation of an image based on lossy-compressed image data to be printed; and
a determination unit configured to determine, based on the degree of the compression corresponding to the information acquired by the acquisition unit, a parameter to be used when error diffusion processing is performed on an image obtained by rotating the image based on the image data to be printed, the parameter being for identifying an error which is to be distributed to a different pixel of the image, and the identified error being identified based on the parameter and an error between a pixel of target included in an image based on the image data and a predetermined threshold value,
wherein the determination unit determines a first parameter, in a case where the rotational angle corresponding to the information acquired by the acquisition unit is equal to a predetermined angle, and determines a second parameter, in a case where the rotational angle corresponding to the information is not equal to the predetermined angle, and
wherein an error to be distributed to pixels positioned on the lower right and/or lower left of the pixel of target in a case where the first parameter is used is smaller than that in a case where the second parameter is used.

* * * * *